United States Patent
Ibrahim et al.

(10) Patent No.: US 8,503,929 B2
(45) Date of Patent: Aug. 6, 2013

(54) METHOD AND SYSTEM FOR ROUTING FM DATA TO A BLUETOOTH ENABLED DEVICE VIA A BLUETOOTH LINK

(75) Inventors: Brima Ibrahim, Aliso Viejo, CA (US); Mitchell Buznitsky, Pinabette, CA (US); Angel Polo, San Diego, CA (US); John Walley, Ladera Ranch, CA (US); Theodore A. Trost, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1775 days.

(21) Appl. No.: 11/287,034

(22) Filed: Nov. 22, 2005

(65) Prior Publication Data

US 2006/0270347 A1 Nov. 30, 2006

Related U.S. Application Data

(60) Provisional application No. 60/685,239, filed on May 26, 2005.

(51) Int. Cl.
*H04B 5/00* (2006.01)
*H04B 7/00* (2006.01)

(52) U.S. Cl.
USPC ........ 455/41.1; 455/41.2; 455/41.3; 455/132; 455/133; 455/140; 455/142

(58) Field of Classification Search
USPC ............... 455/41, 78, 132, 133, 140, 142
See application file for complete search history.

(56) References Cited

U.S. PATENT DOCUMENTS

| 2004/0204168 A1* | 10/2004 | Laurila | 455/569.1 |
| 2005/0164632 A1* | 7/2005 | Hamada | 455/39 |
| 2006/0223467 A1* | 10/2006 | Mason | 455/185.1 |

\* cited by examiner

*Primary Examiner* — Wen Huang
(74) *Attorney, Agent, or Firm* — Thomas|Horstemeyer, LLP.

(57) ABSTRACT

Certain aspects of a method and system for providing wireless communication may comprise encoding within a single chip, FM audio data received by a FM radio. The encoded received FM audio data may be translated within the single chip to a Bluetooth compatible format. The translated received FM audio data may be communicated to at least one off-chip Bluetooth enabled device via the Bluetooth radio via at least one of the following: a synchronous connection oriented (SCO) link, an extended SCO (eSCO) link, and an advanced audio distribution profile (A2DP) link. The received FM audio data may be communicated via a dedicated link that couples the FM radio to a PCM interface that handles the encoding.

27 Claims, 19 Drawing Sheets

METHOD AND SYSTEM FOR ROUTING FM DATA TO A BLUETOOTH ENABLED DEVICE VIA A BLUETOOTH LINK

CROSS-REFERENCE TO RELATED APPLICATIONS/INCORPORATION BY REFERENCE

The application makes reference to, claims priority to, and claims the benefit of U.S. Provisional Application Ser. No. 60/685,239 filed on May 26, 2005.

This application also makes reference to:
U.S. application Ser. No. 11/176,417 filed on Jul. 7, 2005;
U.S. application Ser. No. 11/286,555 filed on Nov. 22, 2005;
U.S. application Ser. No. 11/287,120 filed on Nov. 22, 2005;
U.S. application Ser. No. 11/286,950 filed on Nov. 22, 2005;
U.S. application Ser. No. 11/287,075 filed on Nov. 22, 2005;
U.S. application Ser. No. 11/287,181 filed on Nov. 22, 2005;
U.S. application Ser. No. 11/286,947 filed on Nov. 22, 2005;
U.S. application Ser. No. 11/287,044 filed on Nov. 22, 2005; and
U.S. application Ser. No. 11/286,844 filed on Nov. 22, 2005.

Each of the above stated applications is hereby incorporated herein by reference in its entirety.

FIELD OF THE INVENTION

Certain embodiments of the invention relate to Bluetooth and FM communication technologies. More specifically, certain embodiments of the invention relate to a method and system for routing FM data to a Bluetooth enabled device via a Bluetooth link.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while freeing to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN transceivers.

Furthermore, simultaneous use of a plurality of radios in a handheld may result in significant increases in power consumption. Power being a precious commodity in most wireless mobile devices, combining devices such as a cellular radio, a Bluetooth radio and a WLAN radio requires careful design and implementation in order to minimize battery usage. Additional overhead such as sophisticated power monitoring and power management techniques are required in order to maximize battery life.

The Bluetooth subband codec (SBC) is a low computational complexity audio coding system designed to provide high quality audio at moderate bit rates to Bluetooth enabled devices. The Bluetooth SBC system utilizes a cosine modulated filterbank, for example, for analysis and synthesis. The filterbank may be configured for 4 subbands or 8 subbands, for example. The subband signals may be quantized using a dynamic bit allocation scheme and block adaptive pulse code modulation (PCM) quantization. The number of bits available and the number of bits used for quantization may vary, thereby making the overall bit-rate of the SBC system adjustable. This is advantageous for use in wireless applications where the available wireless bandwidth for audio, and the maximum possible bit-rate may vary over time.

The Bluetooth community has developed specifications that define how to use streaming audio over a Bluetooth link. This opens up Bluetooth technology to a whole new class of audio devices, such as wireless stereo headsets, wireless speakers, and wireless portable MP3 players just to name a few. With the introduction of new Bluetooth specifications for streaming audio, new Bluetooth products such as wireless stereo headsets and wireless file streaming applications are becoming a reality. Wireless applications require solutions that are increasingly low power in order to extend battery life and provide a better end user experience. With existing systems, the computational requirements of high fidelity audio coding may make it cost prohibitive and challenging to add features such as streaming music to wireless devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for routing FM data to a Bluetooth enabled device via a Bluetooth link, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for providing wireless communication may comprise encoding within a single chip, FM audio data received by a FM radio. The encoded received FM audio data may be translated within the single chip to a Bluetooth compatible format. The translated received FM audio data may be communicated to at least one off-chip Bluetooth enabled device via the Bluetooth radio via at least one of the following: a synchronous connection oriented (SCO) link, an extended SCO (eSCO) link, and an advanced audio distribution profile (A2DP) link. The received FM audio data may be communicated via a dedicated link that couples the FM radio to a PCM interface that handles the encoding.

Aspects of the method and system may comprise a single chip that comprises a Bluetooth radio, an FM radio, a processor system, and a peripheral transport unit (PTU). FM data may be received and/or transmitted via the FM radio and Bluetooth data may be received and/or transmitted via the Bluetooth radio. The FM radio may receive radio data system (RDS) data. The PTU may support a plurality of digital and analog interfaces that provide flexibility with the handling of data. A processor in the processor system may enable time-multiplexed processing of FM data and processing of Bluetooth data. The single chip may operate in an FM-only, a Bluetooth-only, and an FM-Bluetooth mode. The single chip may reduce power consumption by disabling portions of the Bluetooth radio during FM-only mode, disabling analog circuitry when performing digital processing and/or disabling all FM functions when in BT-only mode. Communication between Bluetooth and FM channels may be enabled via the single chip.

Figure 1A:
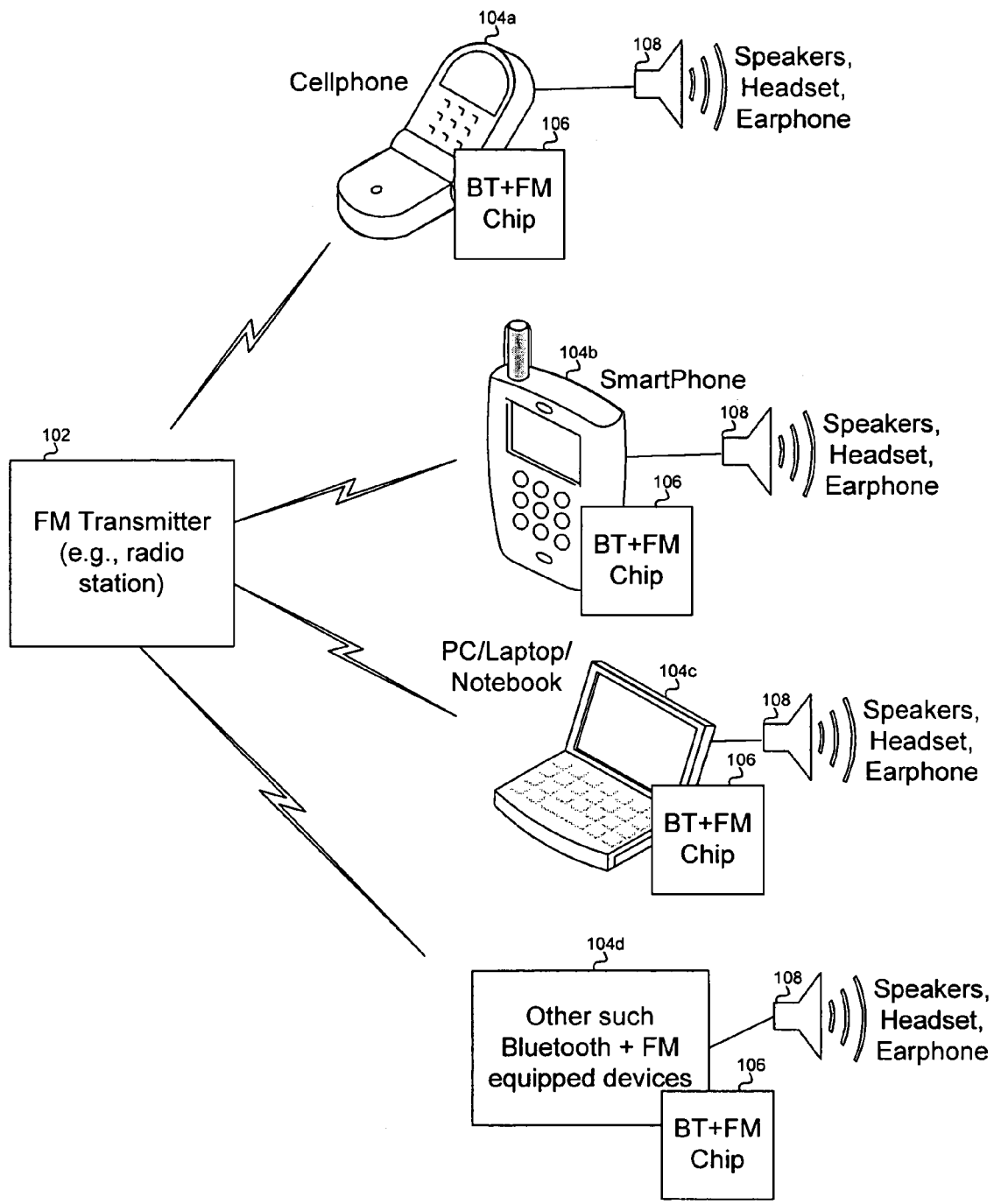
FIG. 1A is a block diagram of an exemplary FM transmitter that communicates with handheld devices that utilize a single chip with integrated Bluetooth and FM radios, in accordance with an embodiment of the invention.

FIG. 1A is a block diagram of an exemplary FM transmitter that communicates with handheld devices that utilize a single chip with integrated Bluetooth and FM radios, in accordance with an embodiment of the invention. Referring to FIG. 1A, there is shown an FM transmitter 102, a cellular phone 104a, a smart phone 104b, a computer 104c, and an exemplary FM and Bluetooth-equipped device 104d. The FM transmitter 102 may be implemented as part of a radio station or other broadcasting device, for example. Each of the cellular phone 104a, the smart phone 104b, the computer 104c, and the exemplary FM and Bluetooth-equipped device 104d may comprise a single chip 106 with integrated Bluetooth and FM radios for supporting FM and Bluetooth data communications. The FM transmitter 102 may enable communication of FM audio data to the devices shown in FIG. 1A by utilizing the single chip 106. Each of the devices in FIG. 1A may comprise and/or may be communicatively coupled to a listening device 108 such as a speaker, a headset, or an earphone, for example.

The cellular phone 104a may be enabled to receive an FM transmission signal from the FM transmitter 102. The user of the cellular phone 104a may then listen to the transmission via the listening device 108. The cellular phone 104a may comprise a "one-touch" programming feature that enables pulling up specifically desired broadcasts, like weather, sports, stock quotes, or news, for example. The smart phone 104b may be enabled to receive an FM transmission signal from the FM transmitter 102. The user of the smart phone 104b may then listen to the transmission via the listening device 108.

The computer 104c may be a desktop, laptop, notebook, tablet, and a PDA, for example. The computer 104c may be enabled to receive an FM transmission signal from the FM transmitter 102. The user of the computer 104c may then listen to the transmission via the listening device 108. The computer 104c may comprise software menus that configure listening options and enable quick access to favorite options, for example. In one embodiment of the invention, the computer 104c may utilize an atomic clock FM signal for precise timing applications, such as scientific applications, for example. While a cellular phone, a smart phone, computing devices, and other devices have been shown in FIG. 1A, the single chip 106 may be utilized in a plurality of other devices and/or systems that receive and use Bluetooth and/or FM signals. In one embodiment of the invention, the single chip Bluetooth and FM radio may be utilized in a system comprising a WLAN radio. The U.S. application Ser. No. 11/286,844, filed on even date herewith, discloses a method and system comprising a single chip Bluetooth and FM radio integrated with a wireless LAN radio, and is hereby incorporated herein by reference in its entirety.

Figure 1B:
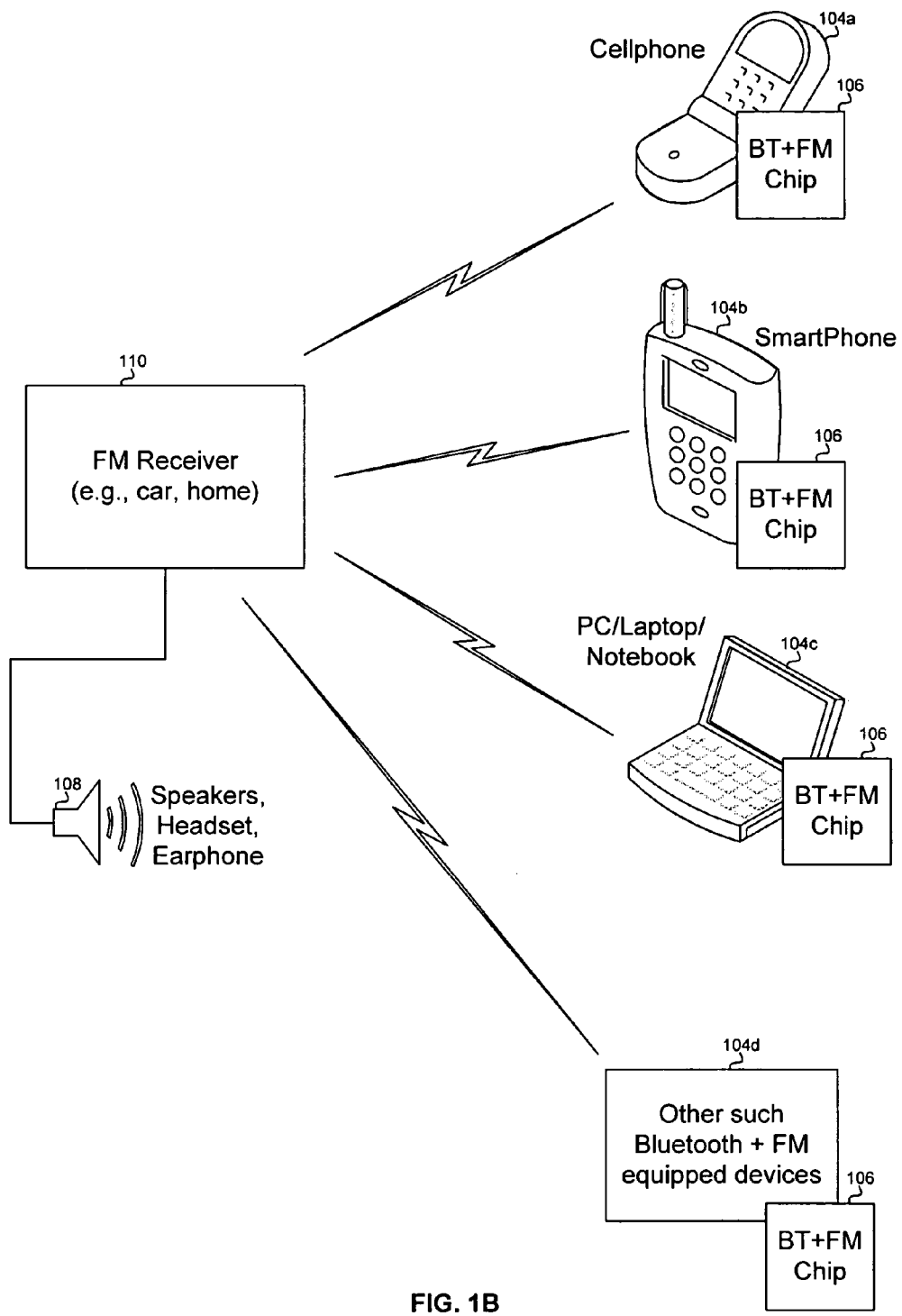
FIG. 1B is a block diagram of an exemplary FM receiver that communicates with handheld devices that utilize a single chip with integrated Bluetooth and FM radios, in accordance with an embodiment of the invention.

FIG. 1B is a block diagram of an exemplary FM receiver that communicates with handheld devices that utilize a single chip with integrated Bluetooth and FM radios, in accordance with an embodiment of the invention. Referring to FIG. 1B, there is shown an FM receiver 110, the cellular phone 104a, the smart phone 104b, the computer 104c, and the exemplary FM and Bluetooth-equipped device 104d. In this regard, the FM receiver 110 may comprise and/or may be communicatively coupled to a listening device 108. A device equipped with the Bluetooth and FM transceivers, such as the single chip 106, may be able to broadcast its respective signal to a "deadband" of an FM receiver for use by the associated audio system. For example, a cellphone or a smart phone, such as the cellular phone 104a and the smart phone 104b, may transmit a telephone call for listening over the audio system of an automobile, via usage of a deadband area of the car's FM stereo system. One advantage may be the universal ability to use this feature with all automobiles equipped simply with an FM radio with few, if any, other external FM transmission devices or connections being required.

In another example, a computer, such as the computer 104c, may comprise an MP3 player or another digital music format player and may broadcast a signal to the deadband of an FM receiver in a home stereo system. The music on the computer may then be listened to on a standard FM receiver with few, if any, other external FM transmission devices or connections. While a cellular phone, a smart phone, and computing devices have been shown, a single chip that combines a Bluetooth and FM transceiver and/or receiver may be utilized in a plurality of other devices and/or systems that receive and use an FM signal.

Figure 1C:
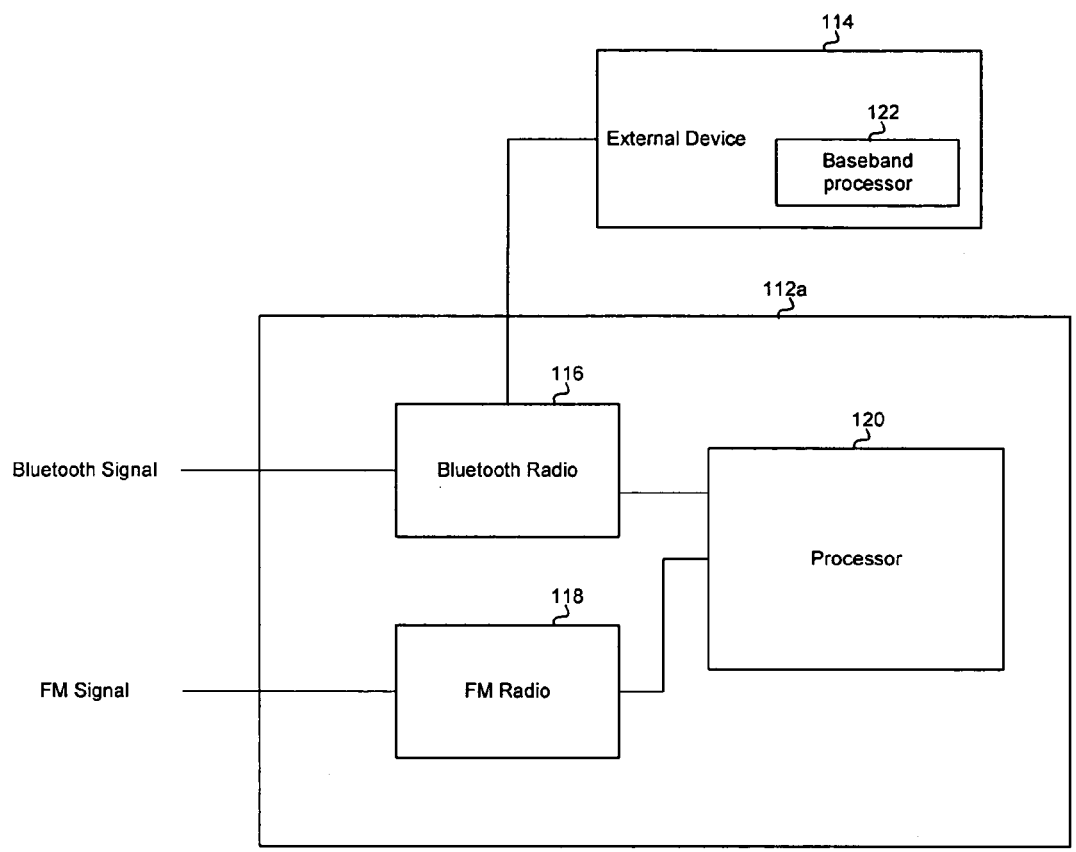
FIG. 1C is a block diagram of an exemplary single chip with integrated Bluetooth and FM radios that supports FM processing and an external device that supports Bluetooth processing, in accordance with an embodiment of the invention.

FIG. 1C is a block diagram of an exemplary single chip with integrated Bluetooth and FM radios that supports FM processing and an external device that supports Bluetooth processing, in accordance with an embodiment of the invention. Referring to FIG. 1C, there is shown a single chip 112a that supports Bluetooth and FM radio operations and an external device 114. The single chip 112a may comprise an integrated Bluetooth radio 116, an integrated FM radio 118, and an integrated processor 120. The Bluetooth radio 116 may comprise suitable logic, circuitry, and/or code that enable Bluetooth signal communication via the single chip 112a. In this regard, the Bluetooth radio 116 may support audio signals or communication. The FM radio may comprise suitable logic, circuitry, and/or code that enable FM signal communication via the single chip 112a.

The integrated processor 120 may comprise suitable logic, circuitry, and/or code that may enable processing of the FM data received by the FM radio 118. Moreover, the integrated processor 120 may enable processing of FM data to be transmitted by the FM radio 118 when the FM radio 118 comprises transmission capabilities. The external device 114 may comprise a baseband processor 122. The baseband processor 122 may comprise suitable logic, circuitry, and/or code that may enable processing of Bluetooth data received by the Bluetooth radio 116. Moreover, the baseband processor 122 may enable processing of Bluetooth data to be transmitted by the Bluetooth radio 116. In this regard, the Bluetooth radio 116 may communicate with the baseband processor 122 via the external device 114. The Bluetooth radio 116 may communicate with the integrated processor 120.

Figure 1D:
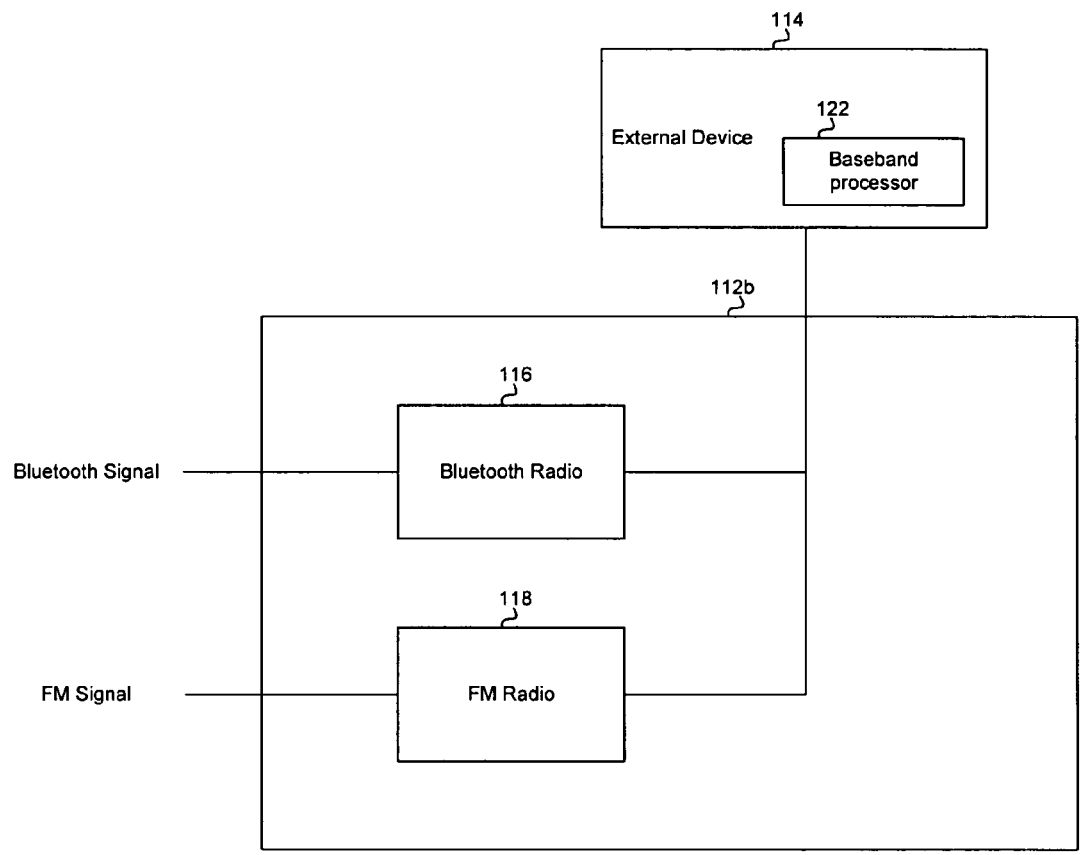
FIG. 1D is a block diagram of an exemplary single chip with integrated Bluetooth and FM radios and an external device that supports Bluetooth and FM processing, in accordance with an embodiment of the invention.

FIG. 1D is a block diagram of an exemplary single chip with integrated Bluetooth and FM radios and an external device that supports Bluetooth and FM processing, in accordance with an embodiment of the invention. Referring to FIG. 1D, there is shown a single chip 112b that supports Bluetooth and FM radio operations and an external device 114. The single chip 112b may comprise the Bluetooth radio 116 and the FM radio 118. The Bluetooth radio 116 and/or the FM radio 118 may be integrated into the single chip 112b. The external device 114 may comprise a baseband processor 122. The baseband processor 122 may comprise suitable logic, circuitry, and/or code that may enable processing of Bluetooth data received by the Bluetooth radio 116 and/or processing of Bluetooth data to be transmitted by the Bluetooth radio 116. In this regard, the Bluetooth radio 116 may communicate with the baseband processor 122 via the external device 114. Moreover, the baseband processor 122 may comprise suitable logic, circuitry, and/or code that may enable processing of the FM data received by the FM radio 118. The baseband processor 122 may enable processing FM data to be transmitted by the FM radio 118 when the FM radio 118 comprises transmission capabilities. In this regard, the FM radio 118 may communicate with the baseband processor 122 via the external device 114.

Figure 1E:
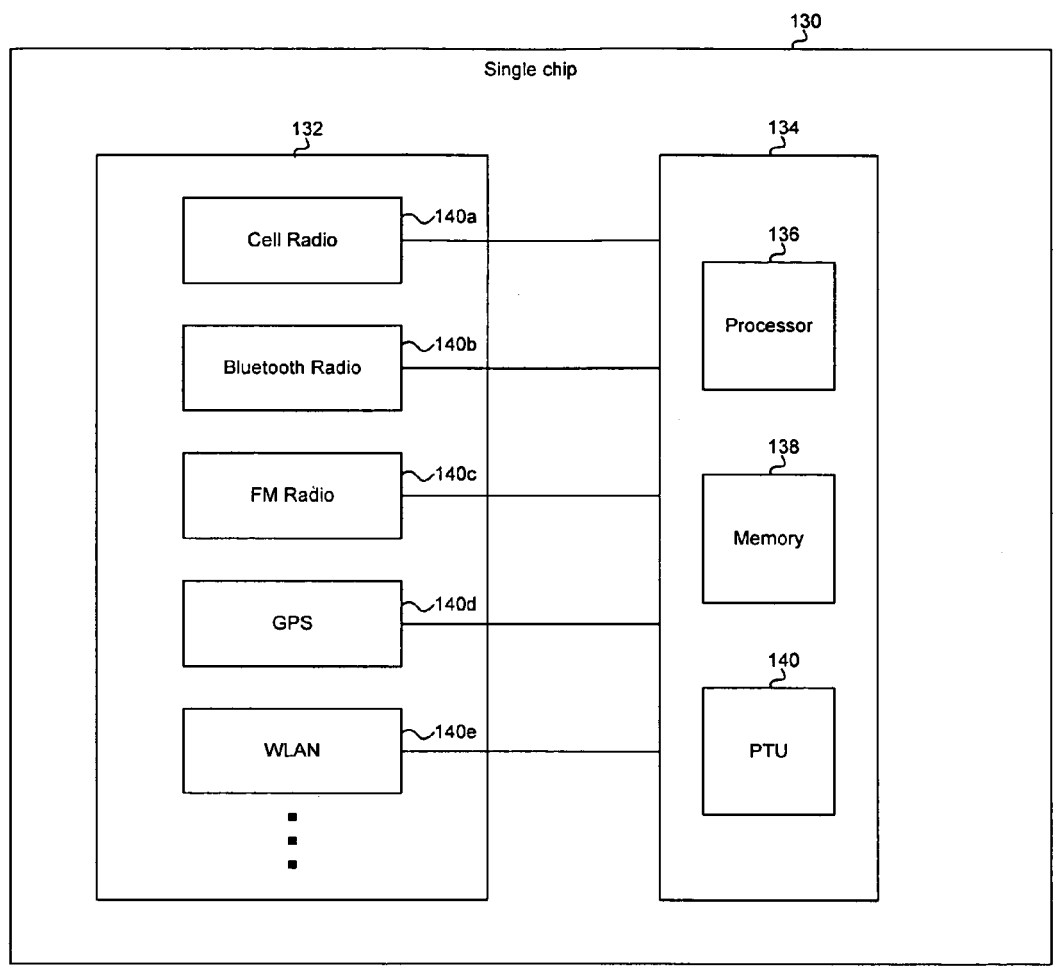
FIG. 1E is a block diagram of an exemplary single chip with multiple integrated radios that supports radio data processing, in accordance with an embodiment of the invention.

FIG. 1E is a block diagram of an exemplary single chip with multiple integrated radios that supports radio data processing, in accordance with an embodiment of the invention. Referring to FIG. 1E, there is shown a single chip 130 that may comprise a radio portion 132 and a processing portion 134. The radio portion 132 may comprise a plurality of integrated radios. For example, the radio portion 132 may comprise a cell radio 140a that supports cellular communications, a Bluetooth radio 140b that supports Bluetooth communications, an FM radio 140c that supports FM communications, a global positioning system (GPS) 140d that supports GPS communications, and/or a wireless local area network (WLAN) 140e that supports communications based on the IEEE 802.11 standards.

The processing portion 134 may comprise at least one processor 136, a memory 138, and a peripheral transport unit (PTU) 140. The processor 136 may comprise suitable logic, circuitry, and/or code that enable processing of data received from the radio portion 132. In this regard, each of the integrated radios may communicate with the processing portion 134. In some instances, the integrated radios may communicate with the processing portion 134 via a common bus, for example. The memory 138 may comprise suitable logic, circuitry, and/or code that enable storage of data that may be utilized by the processor 136. In this regard, the memory 138 may store at least a portion of the data received by at least one of the integrated radios in the radio portion 132. Moreover, the memory 138 may store at least a portion of the data that may be transmitted by at least one of the integrated radios in the radio portion 132. The PTU 140 may comprise suitable logic, circuitry, and/or code that may enable interfacing data in the single chip 130 with other devices that may be communicatively coupled to the single chip 130. In this regard, the PTU 140 may support analog and/or digital interfaces.

Figure 1F:
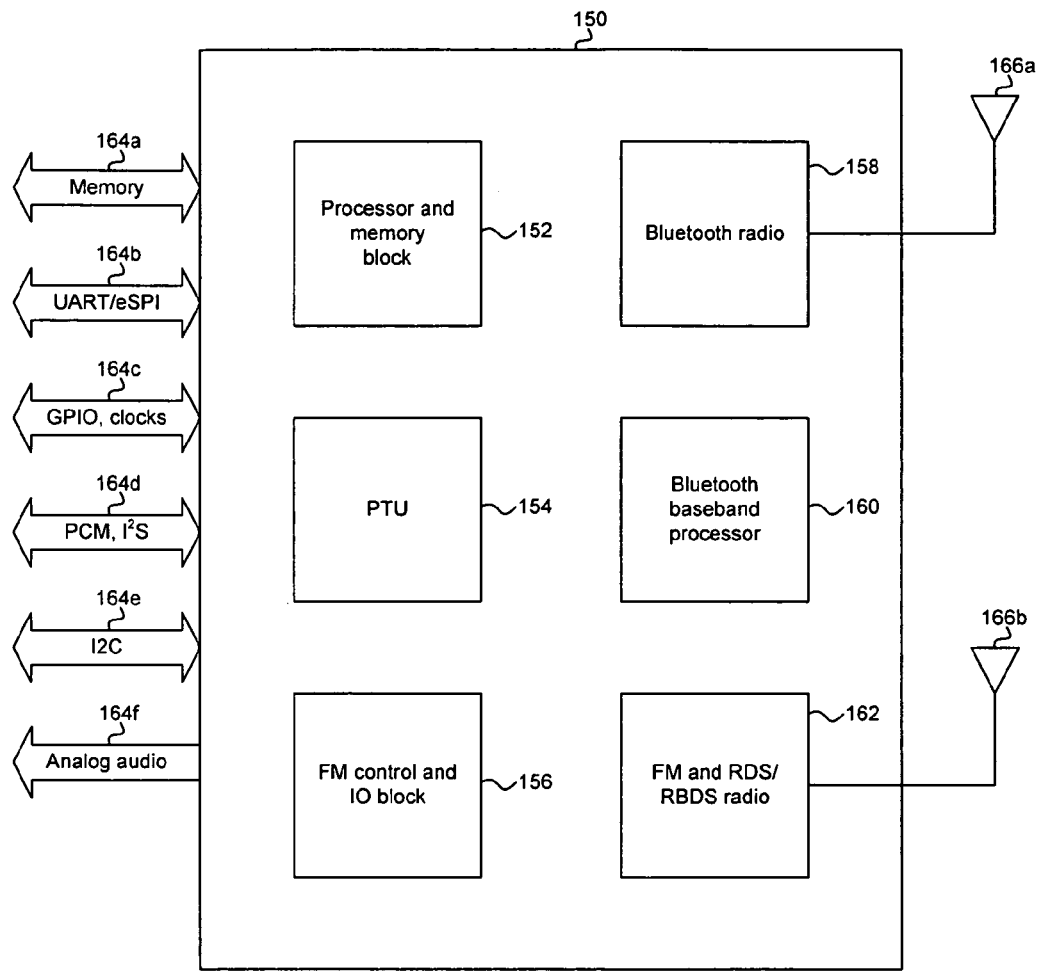
FIG. 1F is a block diagram of an exemplary single chip with integrated Bluetooth and FM radios that supports multiple interfaces, in accordance with an embodiment of the invention.

FIG. 1F is a block diagram of an exemplary single chip with integrated Bluetooth and FM radios that supports multiple interfaces, in accordance with an embodiment of the invention. Referring to FIG. 1F, there is shown a single chip 150 that supports Bluetooth and FM radio communications. The single chip 150 may comprise a processor and memory block 152, a PTU 154, an FM control and input-output (IO) block 156, a Bluetooth radio 158, a Bluetooth baseband processor 160, and an FM and radio data system (RDS) and radio broadcast data system (RDBS) radio 162. A first antenna or antenna system 166a may be communicatively coupled to the Bluetooth radio 158. A second antenna or antenna system 166b may be communicatively coupled to the FM and RDS/RBDS radio 162.

The processor and memory block 152 may comprise suitable logic, circuitry, and/or code that may enable control, management, data processing operations, and/or data storage operations, for example. The PTU 154 may comprise suitable logic, circuitry, and/or code that may enable interfacing the single chip 150 with external devices. The FM control and IO block 156 may comprise suitable logic, circuitry, and/or code that may enable control of at least a portion of the FM and RDS/RBDS radio 162. The Bluetooth radio 158 may comprise suitable logic, circuitry, and/or code that may enable Bluetooth communications via the first antenna 166a. The FM and RDS/RBDS radio 162 may comprise suitable logic, circuitry, and/or code that may enable FM, RDS, and/or RBDS data communication via the second antenna 166b. The Bluetooth baseband processor 160 may comprise suitable logic, circuitry, and/or code that may enable processing of baseband data received from the Bluetooth radio 158 or baseband data to be transmitted by the Bluetooth radio 158.

The PTU 154 may support a plurality of interfaces. For example, the PTU 154 may support an external memory interface 164a, a universal asynchronous receiver transmitter (UART) and/or enhanced serial peripheral interface (eSPI) interface 164b, a general purpose input/output (GPIO) and/or clocks interface 164c, a pulse-code modulation (PCM) and/or an inter-IC sound ($I^2S$) interface 164d, an inter-integrated circuit ($I^2C$) bus interface 164e, and/or an audio interface 164f.

Figure 1G:
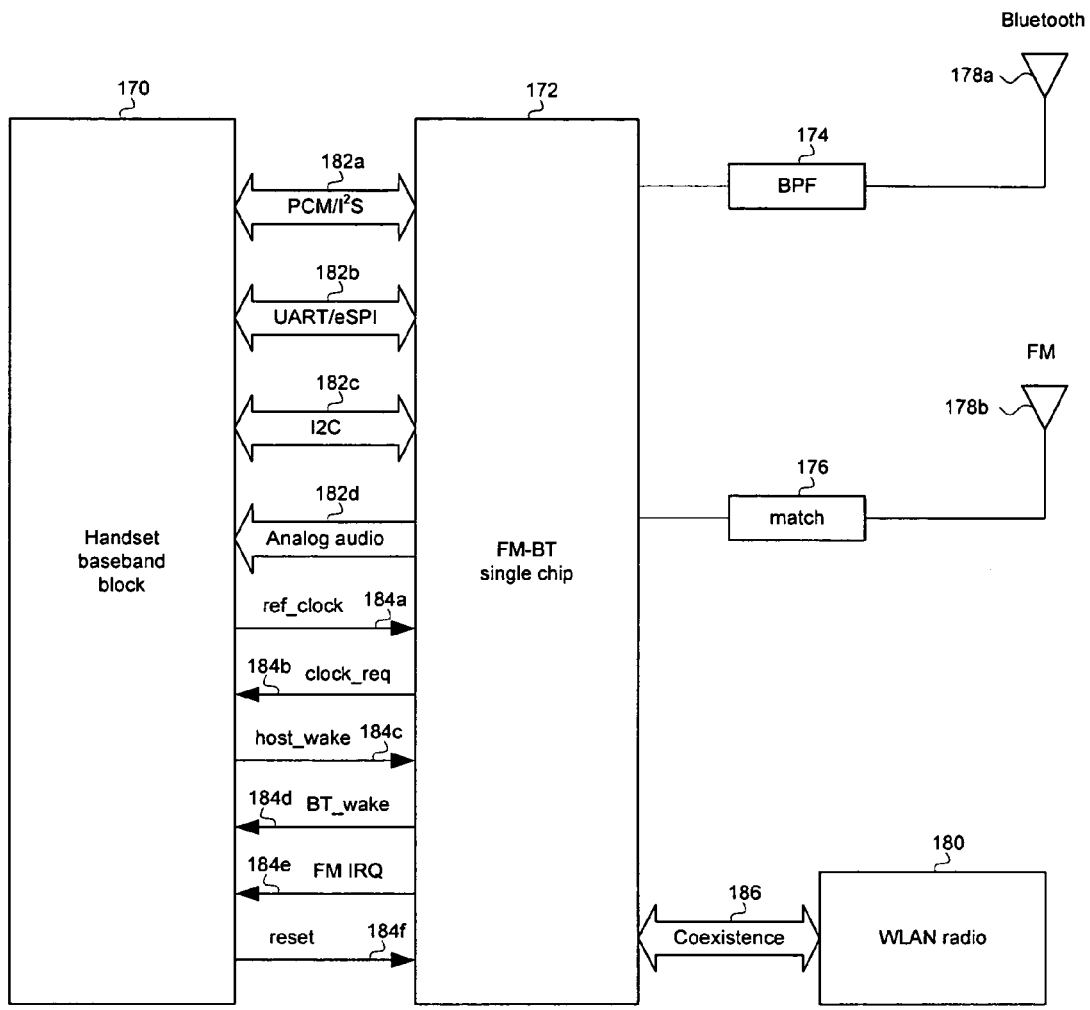
FIG. 1G is a block diagram of an exemplary single chip with integrated Bluetooth and FM radios that supports interfacing with a handset baseband device and a coexistent wireless LAN (WLAN) radio, in accordance with an embodiment of the invention.

FIG. 1G is a block diagram of an exemplary single chip with integrated Bluetooth and FM radios that supports interfacing with a handset baseband device and a coexistent wireless LAN (WLAN) radio, in accordance with an embodiment of the invention. Referring to FIG. 1G, there is shown a single chip 172, a handset baseband block 170, a band pass filter 174, a first antenna or antenna system 178a, a matching circuit 176, a second antenna or antenna filter 178b, and a WLAN radio 180. The single chip 172 may be substantially similar to the single chip 150. In this instance, the single chip 172 may comprise suitable logic, circuitry, and/or code that may enable coexistent operation with the WLAN radio 180 via the coexistence interface 186.

The single chip 172 may communicate Bluetooth data via the BPF 174 and the first antenna 178a. The single chip 172 may also communicate FM data via the matching circuit 176 and the second antenna 178b. The single chip 172 may coordinate Bluetooth data communication in the presence of WLAN channels by communicating with the WLAN radio 180 via the coexistence interface 186.

The single chip 172 may transfer data to the handset baseband block 170 via at least one interface, such as a PCM/I2S interface 182a, a UART/eSPI interface 182b, a $I^2C$ interface 182c, and/or and analog audio interface 182d. The single chip 172 and the handset baseband block 170 may also communicate via at least one control signal. For example, the handset baseband block 170 may generate a clock signal, ref_clock, 184a, a wake signal, host_wake 184c, and/or a reset signal 184f that may be transferred to the single chip 172. Similarly, the single chip 172 may generate a clock request signal, clock_req, 184b, a Bluetooth wake signal, BT_wake, 184d, and/or an FM interrupt request signal, FM IRQ, 184e that may be transferred to the handset baseband block 170. The handset baseband block 170 may comprise suitable logic, circuitry, and/or code that may enable processing of at least a portion of the data received from the single chip 172 and/or data to be transferred to the single chip 172. In this regard, the handset baseband block 170 may transfer data to the single chip 172 via at least one interface.

Figure 1H:
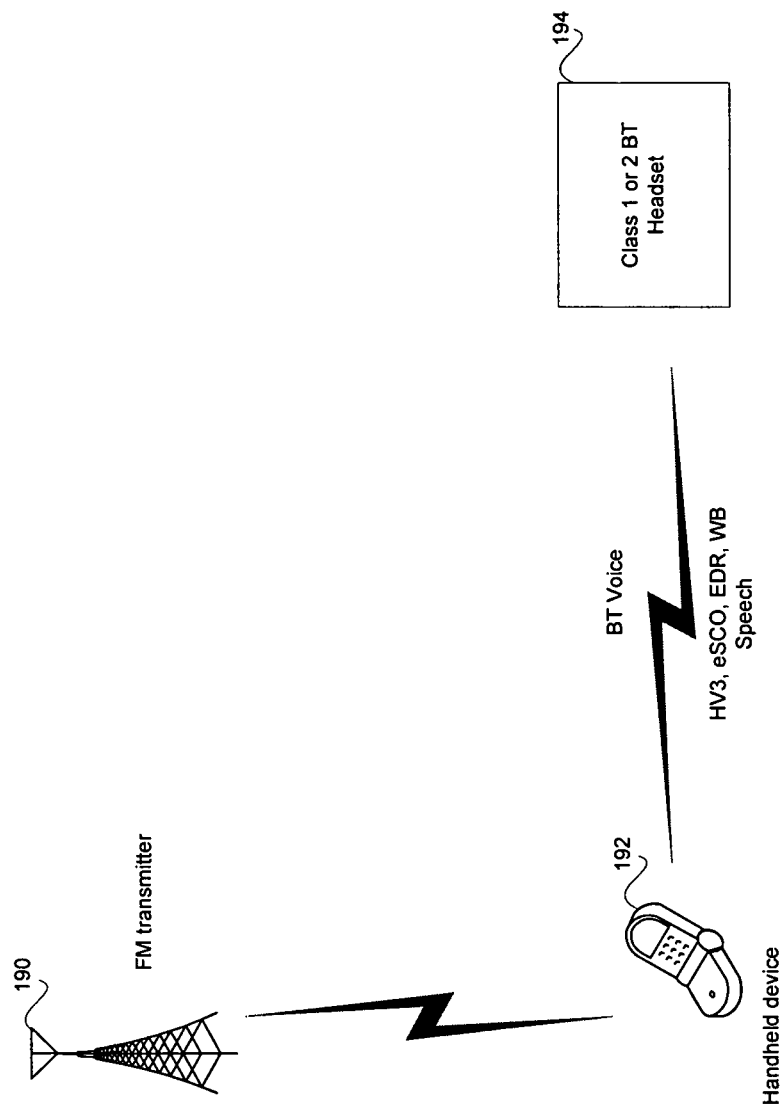
FIG. 1H is a block diagram that illustrates an embodiment of an exemplary usage model for a coexistence terminal with collocated FM and Bluetooth radio devices, in accordance with an embodiment of the invention.

FIG. 1H is a block diagram that illustrates an embodiment of an exemplary usage model for a coexistence terminal with collocated FM and Bluetooth radio devices, in accordance with an embodiment of the invention. Referring to FIG. 1H, there is shown a FM transmitter 190, a handheld device, for example, a mobile phone 192 and a Bluetooth headset 194.

The FM transmitter 190 may be implemented as part of a radio station or other broadcasting device, for example. The FM transmitter 190 may enable communication of FM signals comprising audio signal and data signals. Transmitted FM signals may be received by the mobile phone 192, which may comprise a single chip, for example single chip 106. The mobile phone 192 may comprise a FM receiver radio device, for example, FM radio block 118 to communicate with the FM transmitter 190. The mobile phone 192 may also be Bluetooth-enabled and may comprise a Bluetooth radio device, for example, Bluetooth radio block 116 to communicate with, for example, the Bluetooth headset 194. The Bluetooth headset 194 may comprise suitable hardware, logic, circuitry, and/or code that may be adapted to receive and/or transmit audio information.

The mobile phone 192 may be enabled to receive an FM transmission signal from the FM transmitter 190. The user of the mobile phone 192 may then listen to the transmission via the Bluetooth headset 194, for example. The mobile phone 192 may be coupled to the Bluetooth headset 194 via a Bluetooth (BT) connection between the mobile phone 192 and the BT headset 194. The BT interface may be enabled to carry voice traffic with packetized frames, but the data may be processed as a synchronous pulse coded modulated (PCM) stream by the voice processor 120.

The mobile phone 192 may be enabled to interface the voice processor 120 and the Bluetooth radio block 116. Command and control data may be passed through a serial interface, for example, USB or UART 182b known as the host controller interface (HCI). Voice data may be communicated either through a PCM interface 182a or through the HCI. In one exemplary embodiment of the invention, the PCM interface 182a may enable processing of voice samples using four pins, for example, a clock pin, a frame synchronization pin, an input data pin and an output data pin. The voice data may be sampled at 8 kHz at 12 to 16 bits per sample, for example. Each sample may be clocked in/out on the PCM interface 182a one bit at a time once every 125 microseconds, for example. In a two-wire coexistence interface, one wire may be an output from the BT radio block 116 and the other may be an input. These wires may indicate when each radio is transmitting.

When a user speaks into the BT headset 194 to a remote party, the voice may be sampled by the BT headset 194, converted into mu-law, A-law or continuous variable slope delta (CVSD) format. After conversion, the voice samples may be packetized into HV3 packets, and transmitted to the mobile phone 192. The BT radio block 116 in the mobile phone 194 may be adapted to receive the packetized HV3 packets, which may be processed by the BT radio block 116. The BT radio block 116 may enable conversion of the voice back into uniform samples and transmit the samples to the voice processor 120 using the HCI or PCM interface 182a. The voice processor 120 may enable collection of the samples into memory and encoding the samples once every frame period, for example. The length of the frame period may depend on the type of voice compression, for example, 5 to 30 ms. After the voice compression, the samples may be decoded and transferred to the FM radio block 118. The FM radio block 118 may transfer the decoded data to the FM transmitter 190 for communication to an FM receiver in another device.

When a FM transmitter 190 attempts to transmit to a user with the BT headset 194, the FM audio data may be transmitted from the FM transmitter 190 to the mobile phone 192. The FM radio block 118 in the mobile phone 192 may be enabled to receive the FM audio data from the FM transmitter 190. The received FM audio data may be processed by the voice processor in the mobile phone 192. The received audio data may be buffered and de-jittered, and the voice data may be de-compressed. The voice may be converted to uniform samples, which may be passed via the PCM or HCI interface 182*a* at 8 kHz, for example, to the BT radio block 116. The BT radio block 116 may be enabled to decode the voice samples from mu-law, A-law or CVSD into voice data. The voice data may be packetized and transmitted as HV3 packets to the BT headset 194. The BT headset 194 may be enabled to receive the packets, convert the voice to uniform samples and play them out the speaker.

The mobile phone 192 may be enabled to communicate with the BT radio block 116. At the lowest level, software may be utilized to control the UART and control lines such as the reset line to the BT radio block 116 and power control lines. Software may be utilized to communicate with the BT radio block 116 by allowing BT profiles to be implemented such as the headset profile. The BT radio block 116 may be adapted to communicate with the lower level software through abstraction layers such as the operating system (OS) independent generic kernel interface (GKI), for example. Application code may be utilized to control the headset provided by the headset profile.

In an embodiment of the invention, the application code may enable translation of commands from the user interface into application program interface (API) calls to enable the headset profile, pair the headset, establish or break a synchronous connection oriented (SCO) connection to the headset, and to change the volume of the headset. The application code may communicate back events from the BT radio block 116, such as success or failure at setting up the SCO connection. In an embodiment of the invention, the voice processing software may be adapted to determine where to send and receive its voice samples based on whether or not the BT headset 194 is in use. For example, the samples may be routed to the PCM interface 182*a* when BT headset 194 is in use, and to an internal audio block otherwise.

Figure 2A:
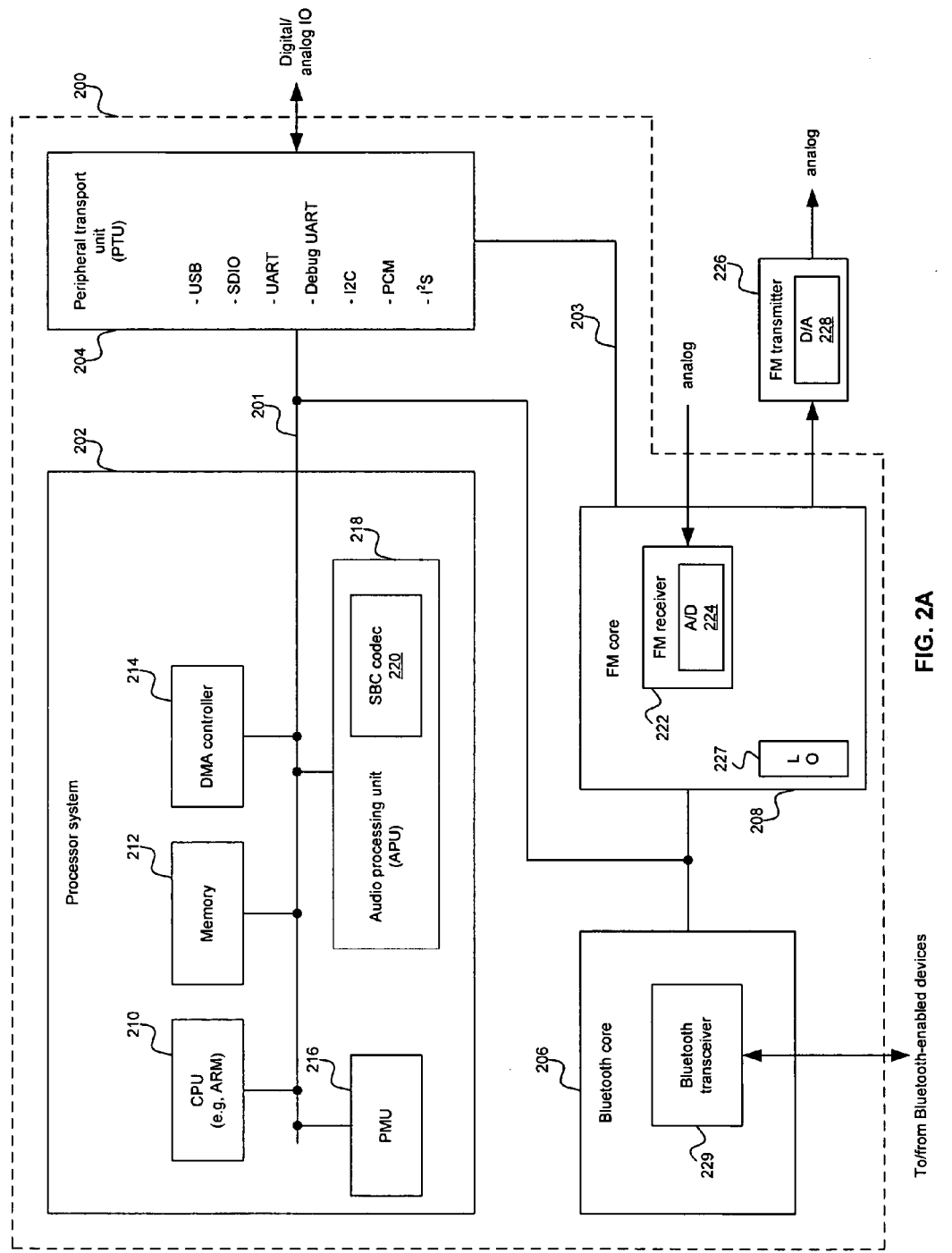
FIG. 2A is a block diagram of an exemplary single chip that supports Bluetooth and FM operations with an external FM transmitter, in accordance with an embodiment of the invention.

FIG. 2A is a block diagram of an exemplary single chip that supports Bluetooth and FM operations with an external FM transmitter, in accordance with an embodiment of the invention. Referring to FIG. 2A, there is shown a single chip 200 that may comprise a processor system 202, a peripheral transport unit (PTU) 204, a Bluetooth core 206, a frequency modulation (FM) core 208, and a common bus 201. A FM transmitter 226 may be an external device to the single chip 200 and may be communicatively coupled to the single chip 200 via the FM core 208, for example. The FM transmitter 226 may be a separate integrated circuit (IC), for example.

The processor system 202 may comprise a central processing unit (CPU) 210, a memory 212, a direct memory access (DMA) controller 214, a power management unit (PMU) 216, and an audio processing unit (APU) 218. The APU 218 may comprise a subband coding (SBC) codec 220. At least a portion of the components of the processor system 202 may be communicatively coupled via the common bus 201.

The CPU 210 may comprise suitable logic, circuitry, and/or code that may enable control and/or management operations in the single chip 200. In this regard, the CPU 210 may communicate control and/or management operations to the Bluetooth core 206, the FM core 208, and/or the PTU 204 via a set of register locations specified in a memory map. Moreover, the CPU 210 may be utilized to process data received by the single chip 200 and/or to process data to be transmitted by the single chip 200. The CPU 210 may enable processing of data received via the Bluetooth core 206, via the FM core 208, and/or via the PTU 204. For example, the CPU 210 may enable processing of A2DP data and may then transfer the processed A2DP data to other components of the single chip 200 via the common bus 201. In this regard, the CPU may utilize the SBC codec 220 in the APU 218 to encode and/or decode A2DP data, for example. The CPU 210 may enable processing of data to be transmitted via Bluetooth core 206, via the FM core 208, and/or via the PTU 204. The CPU 210 may be, for example, an ARM processor or another embedded processor core that may be utilized in the implementation of system-on-chip (SOC) architectures.

The CPU 210 may time multiplex Bluetooth data processing operations and FM data processing operations. In this regard, the CPU 210 may perform each operation by utilizing a native clock, that is, Bluetooth data processing based on a Bluetooth clock and FM data processing based on an FM clock. The Bluetooth clock and the FM clock may be distinct and may not interact. The CPU 210 may gate the FM clock and the Bluetooth clock and may select the appropriate clock in accordance with the time multiplexing scheduling or arrangement. When the CPU 210 switches between Bluetooth operations and FM operations, at least certain states associated with the Bluetooth operations or with the FM operations may be retained until the CPU 210 switches back.

For example, in the case where the Bluetooth function is not active and is not expected to be active for some time, the CPU 210 may run on a clock derived from the FM core 208. This may eliminate the need to bring in a separate high-speed clock when one is already available in the FM core 208. In the case where the Bluetooth core 206 may be active, for example when the Bluetooth is in a power-saving mode that requires it to be active periodically, the processor may chose to use a clock derived separately from the FM core 208. The clock may be derived directly from a crystal or oscillator input to the Bluetooth core 206, or from a phase locked loop (PLL) in the Bluetooth core 206. While this clocking scheme may provide certain flexibility in the processing operations performed by the CPU 210 in the single chip 200, other clocking schemes may also be implemented.

The CPU 210 may also enable configuration of data routes to and/or from the FM core 208. For example, the CPU 210 may configure the FM core 208 so that data may be routed via an I²S interface or a PCM interface in the PTU 204 to the analog ports communicatively coupled to the PTU 204.

The CPU 210 may enable tuning, such as flexible tuning, and/or searching operations in Bluetooth and/or FM communication by controlling at least a portion of the Bluetooth core 206 and/or the FM core 208. For example, the CPU 210 may generate at least one signal that tunes the FM core 208 to a certain frequency to determine whether there is a station at that frequency. When a station is found, the CPU 210 may configure a path for the audio signal to be processed in the single chip 200. When a station is not found, the CPU 210 may generate at least one additional signal that tunes the FM core 208 to a different frequency to determine whether a station may be found at the new frequency.

Searching algorithms may enable the FM core 208 to scan up or down in frequency from a presently tuned channel and stop on the next channel with received signal strength indicator (RSSI) above a threshold. The search algorithm may be able to distinguish image channels. The choice of the IF frequency during search is such that an image channel may have a nominal frequency error of 50 kHz, which may be used to distinguish the image channel from the "on" channel. The search algorithm may also be able to determine if a high side or a low side injection provides better receive performance, thereby allowing for a signal quality metric to be developed for this purpose. One possibility to be investigated is monitoring the high frequency RSSI relative to the total RSSI. The IF may be chosen so that with the timing accuracy that a receiver may be enabled to provide, the image channels may comprise a frequency error that is sufficiently large to differentiate the image channels from the on channel.

The CPU 210 may enable a host controller interface (HCI) in Bluetooth. In this regard, the HCI provides a command interface to the baseband controller and link manager, and access to hardware status and control registers. The HCI may provide a method of accessing the Bluetooth baseband capabilities that may be supported by the CPU 210.

The memory 212 may comprise suitable logic, circuitry, and/or code that may enable data storage. In this regard, the memory 212 may be utilized to store data that may be utilized by the processor system 202 to control and/or manage the operations of the single chip 200. The memory 212 may also be utilized to store data received by the single chip 200 via the PTU 204 and/or via the FM core 208. Similarly, the memory 212 may be utilized to store data to be transmitted by the single chip 200 via the PTU 204 and/or via the FM core 208. The DMA controller 214 may comprise suitable logic, circuitry, and/or code that may enable transfer of data directly to and from the memory 212 via the common bus 201 without involving the operations of the CPU 210.

The PTU 204 may comprise suitable logic, circuitry, and/or code that may enable communication to and from the single chip 200 via a plurality of communication interfaces. In some instances, the PTU 204 may be implemented outside the single chip 200, for example. The PTU 204 may support analog and/or digital communication with at least one port. For example, the PTU 204 may support at least one universal serial bus (USB) interface that may be utilized for Bluetooth data communication, at least one secure digital input/output (SDIO) interface that may also be utilized for Bluetooth data communication, at least one universal asynchronous receiver transmitter (UART) interface that may also be utilized for Bluetooth data communication, and at least one I2C bus interface that may be utilized for FM data communication, and at least one I²C bus interface that may be utilized for FM control and/or FM and RDS/RBDS data communication. The PTU 204 may also support at least one PCM interface that may be utilized for Bluetooth data communication and/or FM data communication, for example.

The PTU 204 may also support at least one inter-IC sound (I²S) interface, for example. The I²S interface may be utilized to send high fidelity FM digital signals to the CPU 210 for processing, for example. In this regard, the I²S interface in the PTU 204 may receive data from the FM core 208 via a bus 203, for example. Moreover, the I²S interface may be utilized to transfer high fidelity audio in Bluetooth. For example, in the A2DP specification there is support for wideband speech that utilizes 16 kHz of audio. In this regard, the I²S interface may be utilized for Bluetooth high fidelity data communication and/or FM high fidelity data communication. The I²S interface may be a bidirectional interface and may be utilized to support bidirectional communication between the PTU 204 and the FM core 208 via the bus 203. The I²S interface may be utilized to send and receive FM data from external devices such as coder/decoders (CODECs) and/or other devices that may further process the I²S data for transmission, such as local transmission to speakers and/or headsets and/or remote transmission over a cellular network, for example.

The Bluetooth core 206 may comprise suitable logic, circuitry, and/or code that may enable reception and/or transmission of Bluetooth data. The Bluetooth core 206 may comprise a Bluetooth transceiver 229 that may perform reception and/or transmission of Bluetooth data. In this regard, the Bluetooth core 206 may support amplification, filtering, modulation, and/or demodulation operations, for example. The Bluetooth core 206 may enable data to be transferred from and/or to the processor system 202, the PTU 204, and/or the FM core 208 via the common bus 201, for example.

The FM core 208 may comprise suitable logic, circuitry, and/or code that may enable reception and/or transmission of FM data. The FM core 208 may comprise an FM receiver 222 and a local oscillator (LO) 227. The FM receiver 222 may comprise an analog-to-digital (A/D) converter 224. The FM receiver 222 may support amplification, filtering, and/or demodulation operations, for example. The LO 227 may be utilized to generate a reference signal that may be utilized by the FM core 208 for performing analog and/or digital operations. The FM core 206 may enable data to be transferred from and/or to the processor system 202, the PTU 204, and/or the Bluetooth core 206 via the common bus 201, for example. Moreover, the FM core 208 may receive analog FM data via the FM receiver 222. The A/D converter 224 in the FM receiver 222 may be utilized to convert the analog FM data to digital FM data to enable processing by the FM core 208. The FM core 208 may also enable the transfer of digital FM data to the FM transmitter 226. The FM transmitter 226 may comprise a digital-to-analog (D/A) converter 228 that may be utilized to convert digital FM data to analog FM data to enable transmission by the FM transmitter 226. Data received by the FM core 208 may be routed out of the FM core 208 in digital format via the common bus 201 and/or in analog format via the bus 203 to the I²S interface in the PTU 204, for example.

The FM core 208 may enable radio transmission and/or reception at various frequencies, such as, 400 MHz, 900 MHz, 2.4 GHz and/or 5.8 GHz, for example. The FM core 208 may also support operations at the standard FM band comprising a range of about 76 MHz to 108 MHz, for example.

The FM core 208 may also enable reception of RDS data and/or RBDS data for in-vehicle radio receivers. In this regard, the FM core 208 may enable filtering, amplification, and/or demodulation of the received RDS/RBDS data. The RDS/RBDS data may comprise, for example, a traffic message channel (TMC) that provides traffic information that may be communicated and/or displayed to an in-vehicle user.

Digital circuitry within the FM core 208 may be operated based on a clock signal generated by dividing down a signal generated by the LO 227. The LO 227 may be programmable in accordance with the various channels that may be received by the FM core 208 and the divide ratio may be varied in order to maintain the digital clock signal close to a nominal value.

The RDS/RBDS data may be buffered in the memory 212 in the processor system 202. The RDS/RBDS data may be transferred from the memory 212 via the I²C interface when the CPU 210 is in a sleep or stand-by mode. The RDS/RBDS data may be transferred to the memory 212 via the I2C interface when the CPU 210 is in a sleep or stand-by mode. For example, the FM core 208 may post RDS data into a buffer in the memory 212 until a certain level is reached and an interrupt is generated to wake up the CPU 210 to process the RDS/RBDS data. When the CPU 210 is not in a sleep mode, the RDS data may be transferred to the memory 212 via the common bus 201, for example.

Moreover, the RDS/RBDS data received via the FM core 208 may be transferred to any of the ports communicatively coupled to the PTU 204 via the HCI scheme supported by the single chip 200, for example. The RDS/RBDS data may also be transferred to the Bluetooth core 206 for communication to Bluetooth-enabled devices.

In one exemplary embodiment of the invention, the single chip 200 may receive FM audio data via the FM core 208 and may transfer the received data to the Bluetooth core 206 via the common bus 201. The Bluetooth core 206 may transfer the data to the processor system 202 to be processed. In this regard, the SBC codec 220 in the APU 218 may perform SBC coding or other A2DP compliant audio coding for transportation of the FM data over a Bluetooth A2DP link. The processor system 202 may also enable performing continuous variable slope delta (CVSD) modulation, log pulse code modulation (Log PCM), and/or other Bluetooth compliant voice coding for transportation of FM data on Bluetooth synchronous connection-oriented (SCO) or extended SCO (eSCO) links. The Bluetooth-encoded FM audio data may be transferred to the Bluetooth core 206, from which it may be communicated to another device that supports the Bluetooth protocol. The CPU 210 may be utilized to control and/or manage the various data transfers and/or data processing operations in the single chip 200 to support the transmission of FM audio data via the Bluetooth protocol.

Moreover, when Bluetooth data is received, such as A2DP, SCO, eSCO, and/or MP3, for example, the Bluetooth core 206 may transfer the received data to the processor system 202 via the common bus 201. At the processor system 202, the SBC codec 220 may decode the Bluetooth data and may transfer the decoded data to the FM core 208 via the common bus 201. The FM core 208 may transfer the data to the FM transmitter 226 for communication to an FM receiver in another device.

In another exemplary embodiment of the invention, the single chip 200 may operate in a plurality of modes. For example, the single chip 200 may operate in one of an FM-only mode, a Bluetooth-only mode, and an FM-Bluetooth mode. For the FM-only mode, the single chip 200 may operate with a lower power active state than in the Bluetooth-only mode or the FM-Bluetooth mode because FM operation in certain devices may have a limited source of power. In this regard, during the FM-only mode, at least a portion of the operation of the Bluetooth core 206 may be disabled to reduce the amount of power used by the single chip 200. Moreover, at least a portion of the processor system 202, such as the CPU 210, for example, may operate based on a divided down clock from a phase locked-loop (PLL) in the FM core 208. In this regard, the PLL in the FM core 208 may utilize the LO 227, for example.

Moreover, because the code necessary to perform certain FM operations, such as tuning and/or searching, for example, may only require the execution of a few instructions in between time intervals of, for example, 10 ms, the CPU 210 may be placed on a stand-by or sleep mode to reduce power consumption until the next set of instructions is to be executed. In this regard, each set of instructions in the FM operations code may be referred to as a fragment or atomic sequence. The fragments may be selected or partitioned in a very structured manner to optimize the power consumption of the single chip 200 during FM-only mode operation. In some instances, fragmentation may also be implemented in the FM-Bluetooth mode to enable the CPU 210 to provide more processing power to Bluetooth operations when the FM core 208 is carrying out tuning and/or searching operations, for example.

Figure 2B:
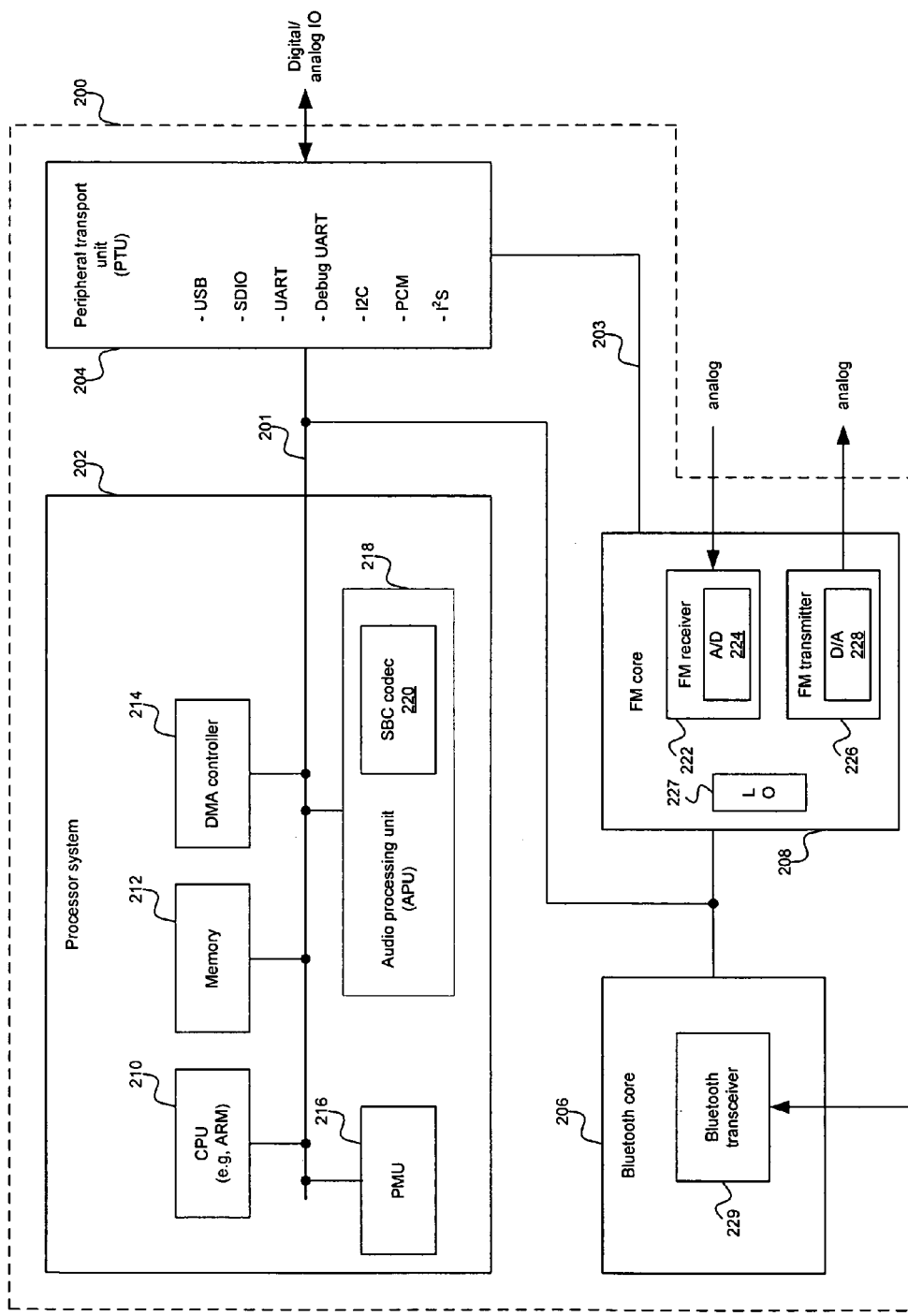
FIG. 2B is a block diagram of an exemplary single chip that supports Bluetooth and FM operations with an integrated FM transmitter, in accordance with an embodiment of the invention.

FIG. 2B is a block diagram of an exemplary single chip that supports Bluetooth and FM operations with an integrated FM transmitter, in accordance with an embodiment of the invention. Referring to FIG. 2B, there is shown the single chip 200 as described in FIG. 2A with the FM transmitter 226 integrated into the FM core 208. In this regard, the FM core 208 may support FM reception and/or transmission of FM data. The FM transmitter 226 may utilize signals generated based on the reference signal generated by the LO 227. The FM core 208 may enable transmission of data received via the PTU 204 and/or the Bluetooth core 206, for example. The exemplary implementation of the single chip 200 as described in FIG. 2B may support FM reception and/or transmission and Bluetooth reception and/or transmission.

Figure 2C:
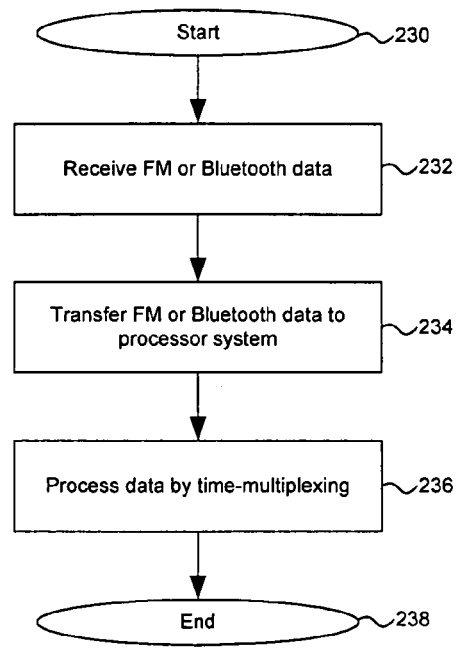
FIG. 2C is a flow diagram that illustrates exemplary steps for processing received data in a single chip with integrated Bluetooth and FM radios, in accordance with an embodiment of the invention.

FIG. 2C is a flow diagram that illustrates exemplary steps for processing received data in a single chip with integrated Bluetooth and FM radios, in accordance with an embodiment of the invention. Referring to FIGS. 2A and 2C, in step 232, after start step 230, the FM core 208 or the Bluetooth core 206 may receive data. For example, the FM core 208 may receive FM data via the FM receiver 222 and the Bluetooth core 206 may receive Bluetooth data via the Bluetooth transceiver 229. In step 234, the received data may be transferred to the processor system 202 via the common bus 201 for processing. The received data may be transferred to the memory 212 by the DMA controller 214, for example. In some instances, the processor system 202 may then transfer the data to the PTU 204, for example. The received data may be transferred to the memory 212 by the DMA controller 214, for example. In some instances, the processor system 202 may then transfer the data to the PUT 204, for example. The received data may be transferred to the processing system 202 in accordance with the time multiplexing schedule or arrangement provided by the processing system 202. In step 236, the processor system 202 may time multiplex the processing of FM data and the processing of Bluetooth data. For example, when Bluetooth data is being processed, FM data may not be transferred to the processing system 202 or may be transferred and stored in the memory 212 until FM processing is enabled. When the processing system 202 has completed processing the Bluetooth data, the FM data may be transferred to the processing system 202 for FM processing. Similarly, when FM data is being processed, Bluetooth data may not be transferred to the processing system 202 or may be transferred and stored in the memory 212 until Bluetooth processing is enabled. When the processing system 202 has completed processing the FM data, the Bluetooth data may be transferred to the processing system 202 for Bluetooth processing. After step 236, the process may proceed to end step 238.

Figure 2D:
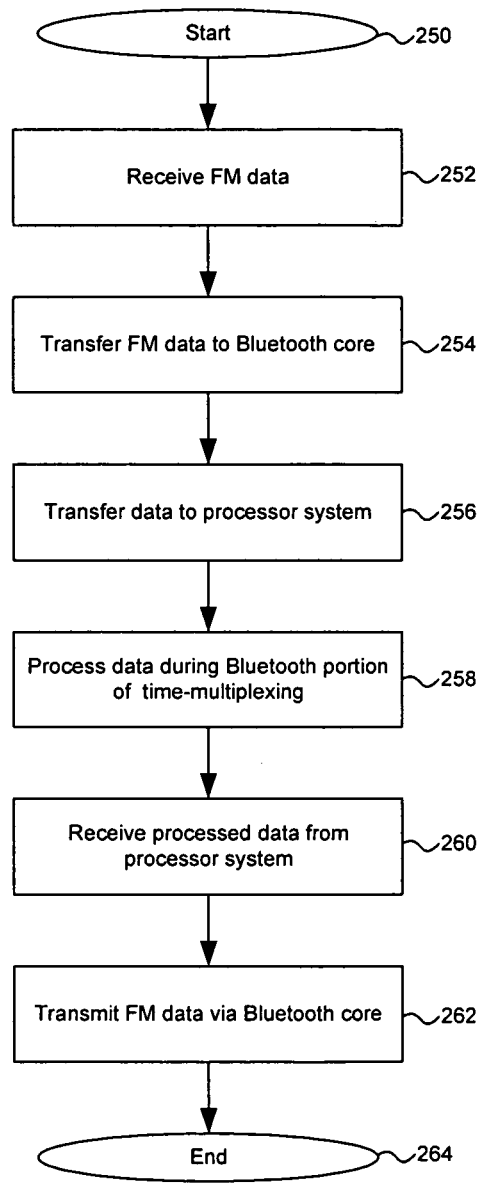
FIG. 2D is a flow diagram that illustrates exemplary steps for processing FM data via the Bluetooth core in a single chip with integrated Bluetooth and FM radios, in accordance with an embodiment of the invention.

FIG. 2D is a flow diagram that illustrates exemplary steps for processing FM data via the Bluetooth core in a single chip with integrated Bluetooth and FM radios, in accordance with an embodiment of the invention. Referring to FIGS. 2A and 2D, after start step 250, in step 252, the FM core 208 may receive FM data via the FM receiver 222. In step 254, the FM core 208 may transfer the FM data to the Bluetooth core 206 via the common bus 201. In step 256, the Bluetooth core 206 may transfer the FM data received from the FM core 208 to the processor system 202 via the common bus 201. In step 258, the processor system 202 may perform Bluetooth processing operations, such as encoding for example, to the FM data received from the Bluetooth core 206. In step 260, the Bluetooth core 206 may receive the processed FM data. In step 262, the Bluetooth core 206 may transfer the processed FM data to at least one Bluetooth-enable device via the Bluetooth transceiver 229.

An illustrative instance where the exemplary steps described in FIG. 2D may occur is when a handset is enabled to receive FM data and the handset may be enabled to operate with a Bluetooth headset. In this regard, the handset may receive the FM audio signal via the FM core 208 and may process the received signal for transfer to the headset via the Bluetooth core 206.

Figure 2E:
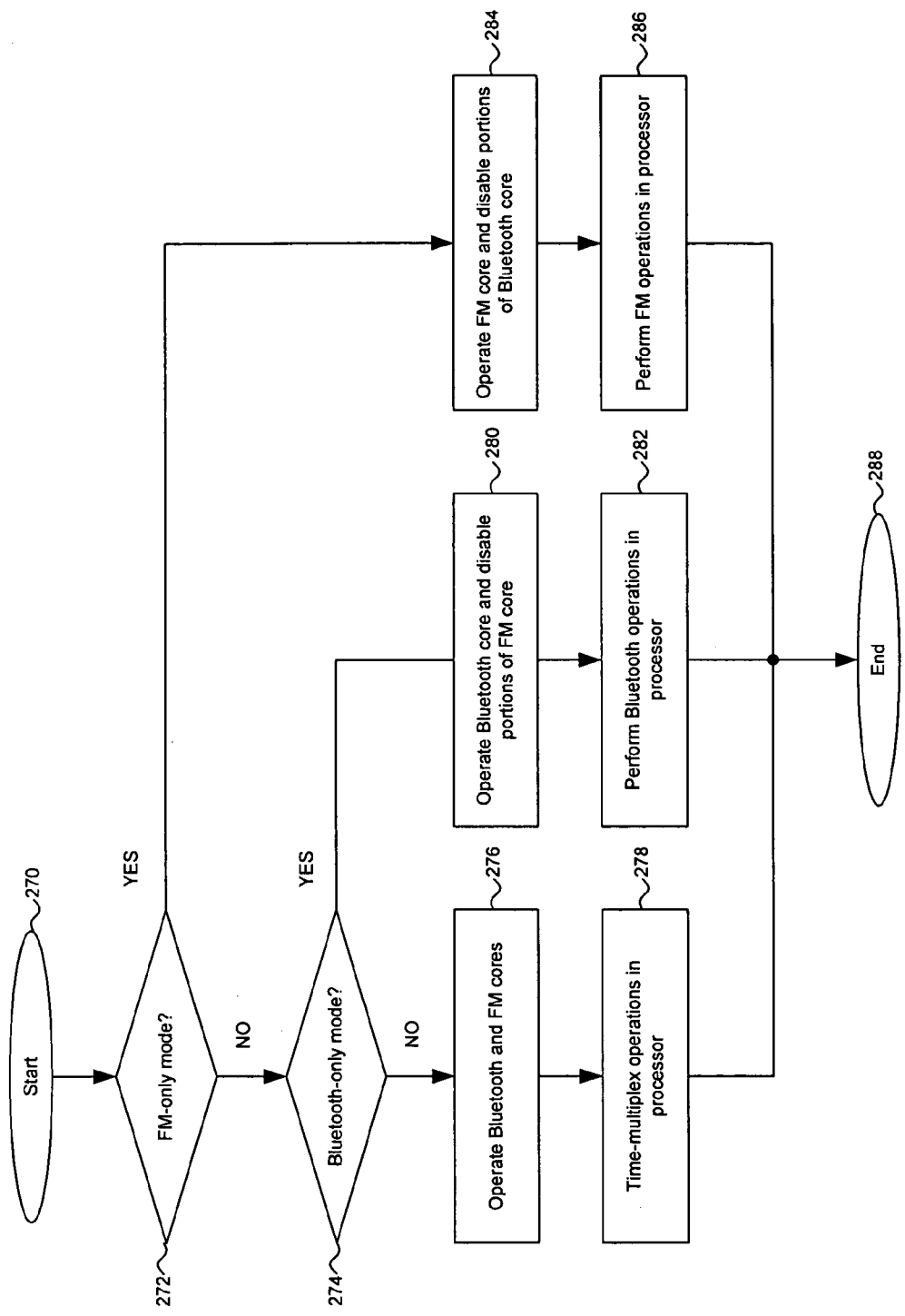
FIG. 2E is a flow diagram that illustrates exemplary steps for configuring a single chip with integrated Bluetooth and FM radios based on the mode of operation, in accordance with an embodiment of the invention.

FIG. 2E is a flow diagram that illustrates exemplary steps for configuring a single chip with integrated Bluetooth and FM radios based on the mode of operation, in accordance with an embodiment of the invention. Referring to FIG. 2E, after start step 270, in step 272, when a single chip with integrated Bluetooth and FM radios operates in an FM-only mode, the process may proceed to step 284. In step 284, the FM core 208 may be configured for operation and at least portions of the Bluetooth core 206 may be disabled. In step 286, FM data received and/or FM data to be transmitted may be processed in the processor system 202 without need for time multiplexing.

Returning to step 272, when the single chip is not operating in the FM-only mode, the process may proceed to step 274. In step 274, when the single chip is operating in the Bluetooth-only mode, the process may proceed to step 280. In step 280, the Bluetooth core 206 may be configured for operation and at least portions of the FM core 208 may be disabled. In step 282, Bluetooth data received and/or Bluetooth data to be transmitted may be processed in the processor system 202 without need for time multiplexing.

Returning to step 274, when the single chip is not operating in the Bluetooth-only mode, the process may proceed to step 276. In step 276, the Bluetooth core 206 and the FM core 208 may be configured for operation. In step 278, Bluetooth data and/or FM data may be processed in the processor system 202 in accordance with time multiplexing schedule or arrangement.

Figure 3:
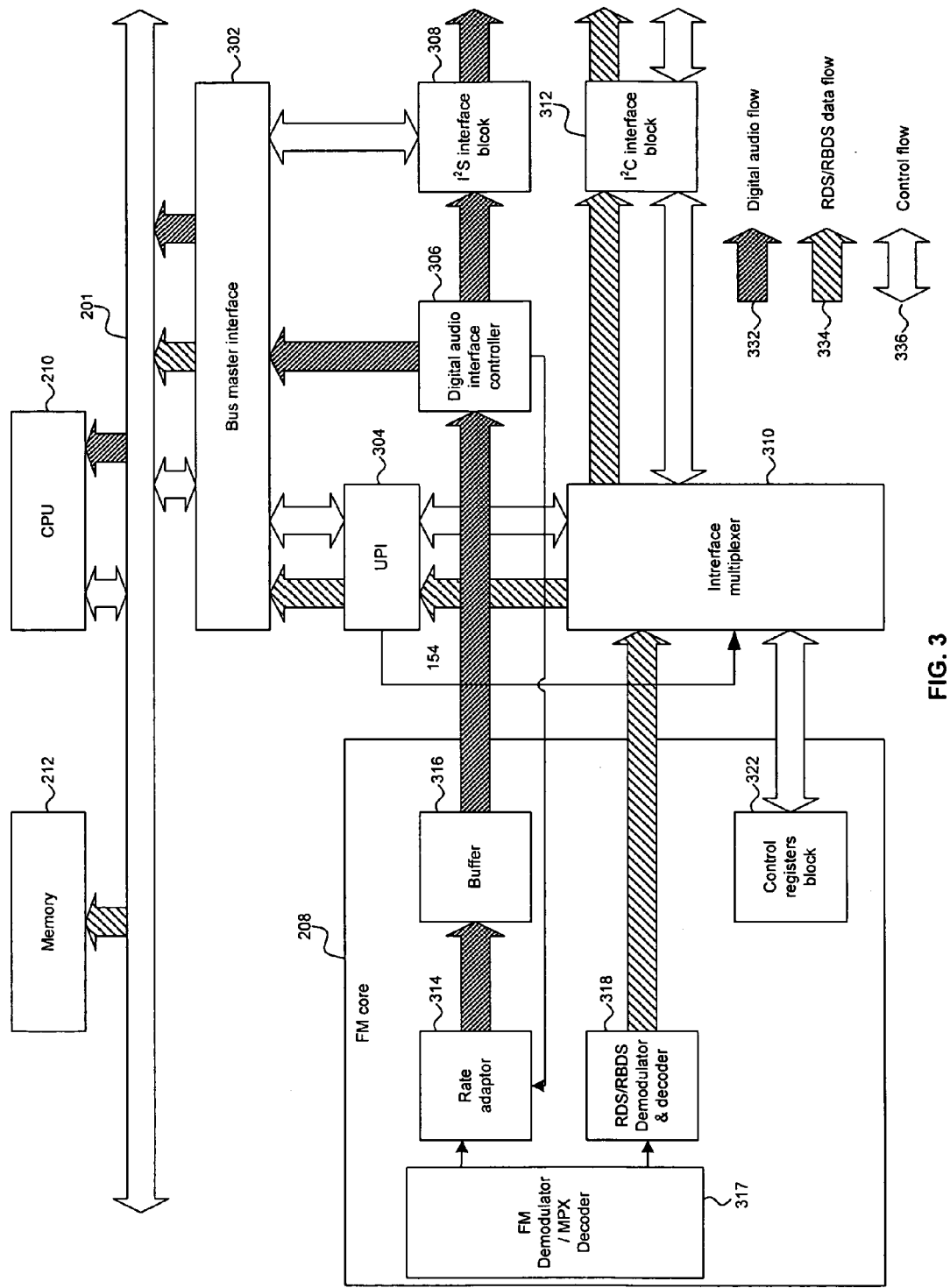
FIG. 3 is a block diagram of an exemplary FM core and PTU for processing RDS and digital audio data, in accordance with an embodiment of the invention.

FIG. 3 is a block diagram of an exemplary FM core and PTU for processing RDS and digital audio data, in accordance with an embodiment of the invention. Referring to FIG. 3, there is shown a more detailed portion of the single chip 200 described in FIGS. 2A-2B. The portion of the single chip 200 shown in FIG. 3 comprises the FM core 208, the memory 212, the CPU 210, and the common bus 201. Also shown are portions of the PTU 204 comprising an interface multiplexer 310, a universal peripheral interface (UPI) 304, a bus master interface 302, a digital audio interface controller 306, an I²S interface block 308, and an I2C interface block 312. The FM core 208 may comprise an FM/MPX demodulator and decoder 317, a rate adaptor 314, a buffer 316, an RDS/RBDS demodulator and decoder 318, and a control registers block 322. Narrowly spaced hashed arrows as illustrated by the flow arrow 332 show the flow of digital audio data. Broadly spaced hashed arrows as illustrated by the flow arrow 334 show the flow of RDS/RBDS data. Clear or blank arrows as illustrated by the dual flow arrow 336 show the flow of control data.

The FM/MPX demodulator and decoder 317 may comprise suitable logic, circuitry, and/or code that may enable processing of FM and/or FM MPX stereo audio, for example. The FM/MPX demodulator and decoder 317 may demodulate and/or decode audio signals that may be transferred to the rate adaptor 314. The FM/MPX demodulator and decoder 317 may demodulate and/or decode signals that may be transferred to the RDS/RBDS demodulator and decoder 318. The rate adaptor 314 may comprise suitable logic, circuitry, and/or code that may enable controlling the rate of the FM data received from the FM/MPX demodulator and decoder 317. The rate adaptor 314 may comprise suitable logic, circuitry, and/or code that may enable controlling the rate of the FM data received by the FM core 208. The rate adaptor 314 may adapt the output sampling rate of the audio paths to the sampling clock of the host device or the rate of a remote device when a digital audio interface is used to transport the FM data. An initial rough estimate of the adaptation fractional change may be made and the estimate may then be refined by monitoring the ratio of reading and writing rates and/or by monitoring the level of the audio samples in the output buffer. The rate may be adjusted in a feedback manner such that the level of the output buffer is maintained. The rate adaptor 314 may receive a strobe or pull signal from the digital audio interface controller 306, for example. Audio FM data from the rate adaptor 314 may be transferred to the buffer 316.

The buffer 316 may receive a strobe or pull signal from the digital audio interface controller 306, for example. The buffer 316 may transfer digital audio data to the digital audio interface controller 306. The digital audio interface controller 306 may comprise suitable logic, circuitry, and/or code that may enable the transfer of digital audio data to the bus master interface 302 and/or the I²S interface block 308. The I²S interface 308 may comprise suitable logic, circuitry, and/or code that may enable transfer of the digital audio data to at least one device communicatively coupled to the single chip. The I²S interface 308 may communicate control data with the bus master interface 302.

The RDS/RBDS demodulator and decoder 318 may comprise suitable logic, circuitry, and/or code that may enable processing of RDS/RBDS data from the FM/MPX demodulator and decoder 317. The RDS/RBDS demodulator and decoder 318 may provide further demodulation and/or decoding to data received from the FM/MPX demodulator and decoder 317. The buffer 316 may comprise suitable logic, circuitry, and/or code that may enable storage of digital audio data. The RDS/RBDS decoder 318 may comprise suitable logic, circuitry, and/or code that may enable processing of RDS/RBDS data received by the FM core 208. The output of the RDS/RBDS decoder 318 may be transferred to the interface multiplexer 310. The interface multiplexer 310 may comprise suitable logic, circuitry, and/or code that may enable the transfer of RDS/RBDS data to the UPI 304 and/or the I²C interface block 312. In this regard, the UPI 304 may generate a signal that indicates to the interface multiplexer 310 the interface to select. The I²C interface 312 may comprise suitable logic, circuitry, and/or code that may enable transfer of the RDS/RBDS data to at least one device communicatively coupled to the single chip. The I²C interface 312 may also communicate control data between external devices to the single chip and the interface multiplexer 310. In this regard, the interface multiplexer 310 may communicate control data between the I²C interface 312, the UPI 304, and/or the control registers block 322 in the FM core 208. The control registers block 322 may comprise suitable logic, circuitry, and/or code that may enable the storage of register information that may be utilized to control and/or configure the operation of at least portions of the FM core 208.

The UPI 304 may comprise suitable logic, circuitry, and/or code that may enable the transfer of digital audio data to the bus master interface 302 from the interface multiplexer 310. The UPI 304 may also enable the communication of control data between the bus master interface 302 and the interface multiplexer 310. The bus master interface 302 may comprise suitable logic, circuitry, and/or code that may enable communication of control data, digital audio data, and/or RDS/RBDS data between the portions of the PTU 204 shown in FIG. 3 and the common bus 201. The bus master interface 302 may transfer digital audio data and/or RDS/RBDS data to the common bus 201. The RDS/RBDS data may be transferred to the memory 212, for example. In some instances, the RDS/RBDS data may be transferred to the memory 212 when the CPU 210 is in a stand-by or sleep mode. The bus master interface 302 may push RDS/RBDS data into a buffer in the memory 212 or may pull RDS/RBDS data from a buffer in the memory 212, for example. The digital audio data may be transferred to the CPU 210 for processing, for example. The CPU 210 may generate and/or receive control data that may be communicated with the PTU 204 and/or the FM core 208 via the common bus 201.

Figure 4:
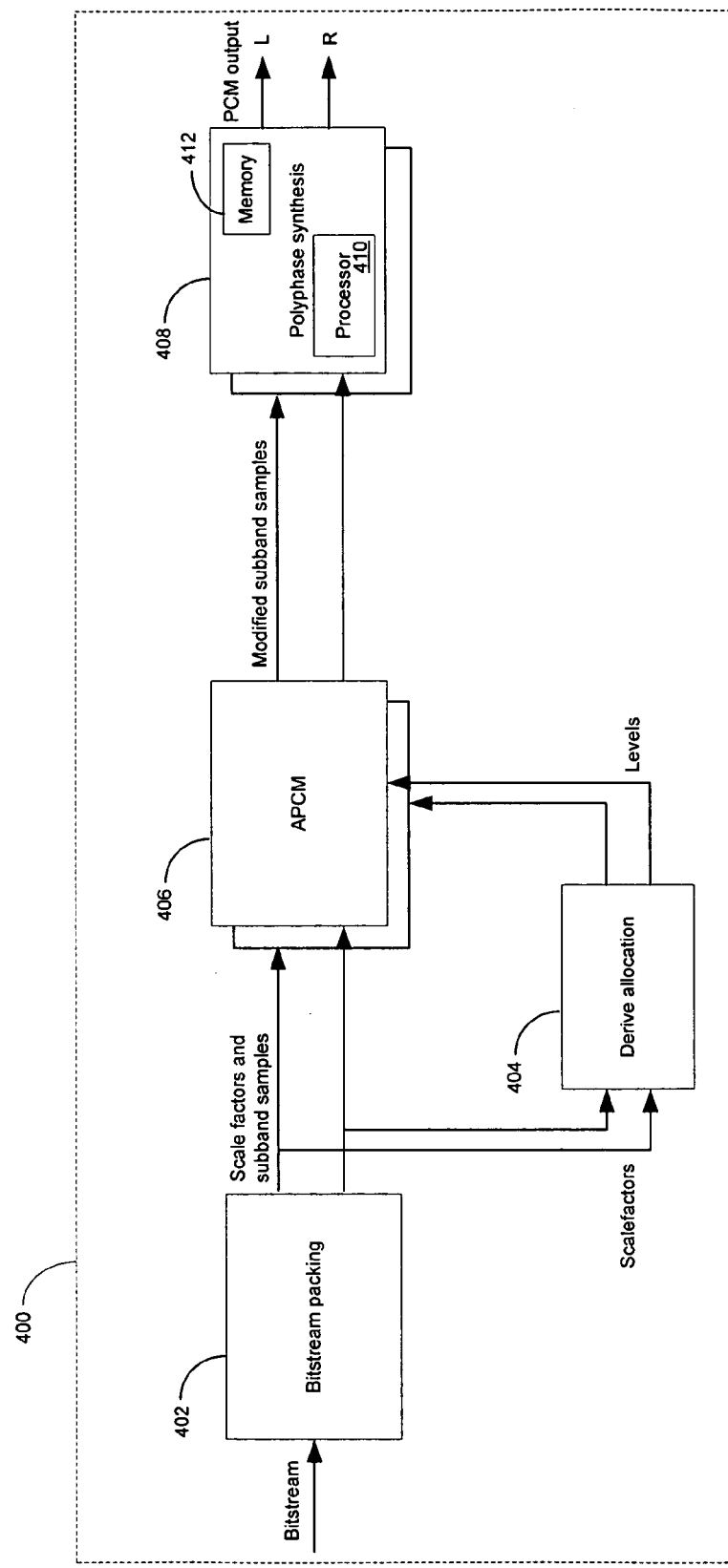
FIG. 4 is a block diagram of an exemplary Bluetooth SBC decoder, in accordance with an embodiment of the invention.

FIG. 4 is a block diagram of an exemplary Bluetooth SBC decoder, in accordance with an embodiment of the invention. Referring to FIG. 4, there is shown a SBC decoder 400. The SBC codec 220 may comprise the SBC decoder 400. The SBC decoder 400 may comprise a bitstream unpacking block 402, a derive allocation block 404, an adaptive pulse coded modulation (APCM) block 406 and a polyphase synthesis block 408.

The bitstream unpacking block 402 may comprise suitable logic, circuitry and/or code that may be adapted to receive a plurality of input bit streams from a device, for example, an audio device. The bitstream unpacking block 402 may enable decomposition of the received input bitstreams into subband signals by means of a cosine modulated filterbank, for example and output the subband samples and scalefactors to the derive allocation block 404 and the APCM 406.

The derive allocation block 404 may comprise suitable logic, circuitry and/or code that may enable receiving of a plurality of input scalefactors from the bitstream unpacking block 402. The derive allocation block 404 may utilize the received scalefactors from the bitstream unpacking block 402 and output a plurality of signals indicating the quantization levels to the APCM 406. By means of adaptive bit allocation, the coding errors may be shaped to remain below a masked threshold. The APCM 406 may comprise suitable logic, circuitry and/or code that may enable receiving of the plurality of subband samples and scalefactors from the bitstream unpacking block 402 and the derive allocation block 404. The APCM 406 may be adapted to quantize the received scalefactors and subband samples from the bitstream unpacking block 402 and the signals received from the derive allocation block 404 and output a plurality of modified subband samples to the polyphase synthesis block 408.

The polyphase synthesis block 408 may comprise suitable logic, circuitry and/or code that may be adapted to receive a plurality of modified subband samples from the APCM 406. The polyphase synthesis block 408 may comprise at least one filter each for the left and right channels. Each filter in the polyphase synthesis block 408 may comprise a processor 410 and a memory 412. The processor 410 may comprise suitable logic, circuitry and/or code that may enable reconstruction of a plurality of audio samples based on a plurality of received subband samples. The processor 410 may be an ARM processor, for example, or other suitable type of processor. The memory 412 may comprise suitable logic, and/or circuitry that may store a plurality of values such as plurality of reciprocal of quantization levels computed by the processor 410. The polyphase synthesis block 408 may synthesize the received plurality of modified subband samples for each channel separately. For each block of decoded subband samples, the polyphase synthesis block 408 may be adapted to calculate a plurality of consecutive audio samples.

Figure 5:
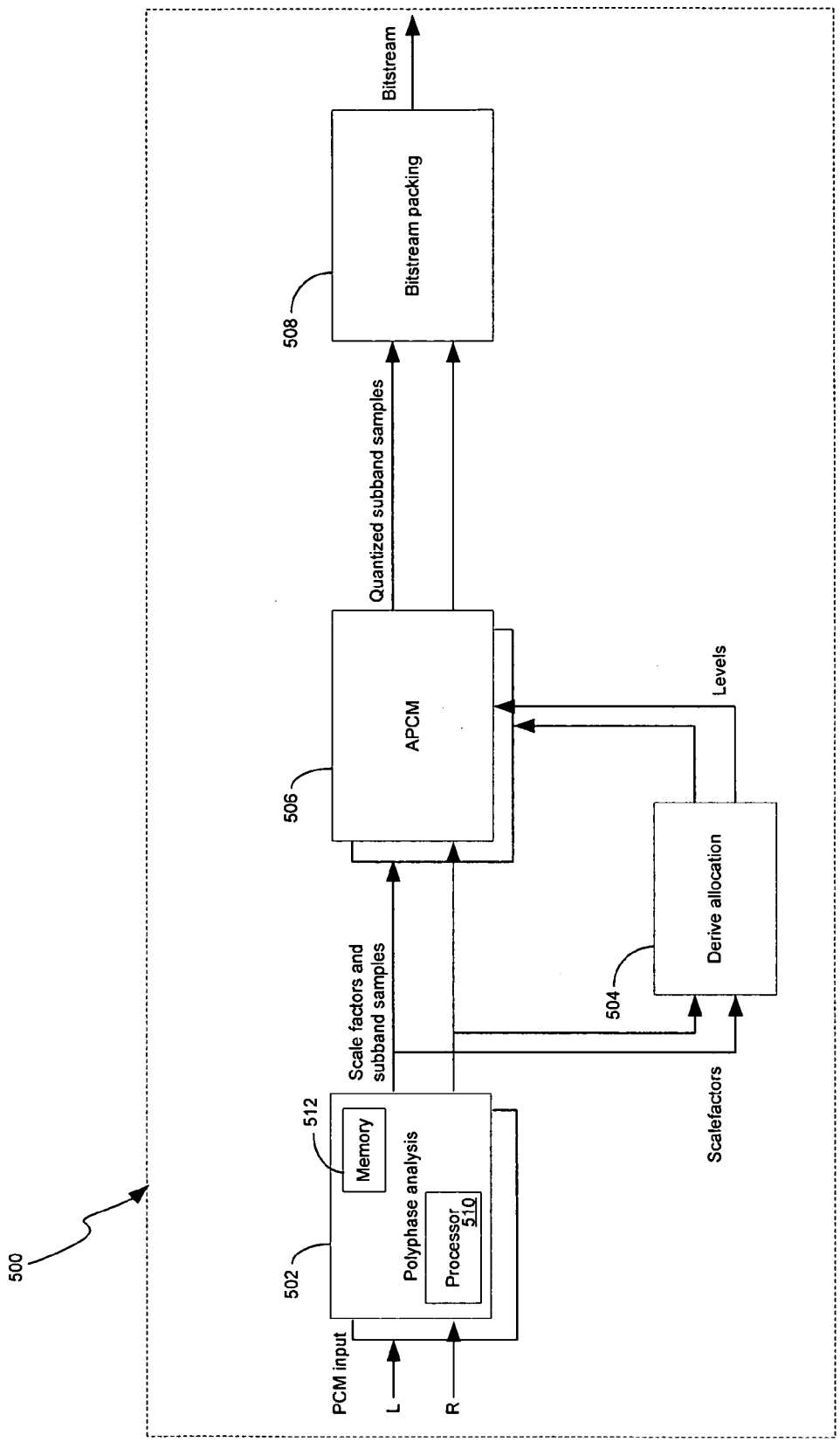
FIG. 5 is a block diagram of an exemplary Bluetooth SBC encoder, in accordance with an embodiment of the invention.

FIG. 5 is a block diagram of an exemplary Bluetooth SBC encoder, in accordance with an embodiment of the invention. Referring to FIG. 5, there is shown a SBC encoder 500. The SBC codec 220 may comprise the SBC decoder 500. The SBC encoder 500 may comprise a polyphase analysis block 502, a derive allocation block 504, an adaptive pulse coded modulation (APCM) block 506 and a bitstream packing block 508.

The polyphase analysis block 502 may comprise suitable logic, circuitry and/or code that may be adapted to receive a plurality of pulse code modulated (PCM) input signals. The polyphase analysis block 502 may comprise at least one filter each for the left and right channels. Each filter in the polyphase analysis block 502 may comprise a processor 510 and a memory 512. The processor 510 may comprise suitable logic, circuitry and/or code that may be adapted to convert a received plurality of audio samples into a plurality of subband samples. The processor 510 may be an ARM processor, for example, or other suitable type of processor. The memory 512 may comprise suitable logic, and/or circuitry that may enable storage of a plurality of values such as plurality of reciprocal of quantization levels computed by the processor 510. The polyphase analysis block 502 may analyze the received plurality of PCM signals for each channel separately. For each block of consecutive PCM samples, the polyphase analysis block 502 may calculate the number of subband samples. For the joint stereo mode of operation, a sum and difference subband signals may be derived from the L and R subband signals and the scalefactors may be calculated for these sum and difference subband signals.

The derive allocation block 504 may comprise suitable logic, circuitry and/or code that may be enabled to receive a plurality of input scalefactors from the polyphase analysis block 502. The derive allocation block 504 may be enabled to utilize the received scalefactors from the polyphase analysis block 502 and output a plurality of signals indicating the quantization levels to the APCM 506.

The APCM 506 may comprise suitable logic, circuitry and/or code that may be enabled to receive the plurality of subband samples and scalefactors from the polyphase analysis block 502 and the derive allocation block 504. The APCM 506 may be enabled to quantize the received scalefactors and subband samples from the polyphase analysis block 502 and the signals received from the derive allocation block 504. The APCM 506 may be enabled to output a plurality of quantized subband samples to the bitstream packing block 508. The bitstream packing block 508 may comprise suitable logic, circuitry and/or code that may be adapted to receive a plurality of quantized subband samples from the APCM 506 and generate a plurality of bitstream signals to a SBC decoder 400, for example.

In operation, the polyphase analysis block 502 may split the received input PCM signals into subband signals. A scale factor may be calculated for each subband. The subband samples may be scaled and quantized by the APCM 506 and the derive allocation block 504. The bitstream packing block 508 may generate a bitstream utilizing the quantized subband samples received from the APCM 506.

Figure 6:
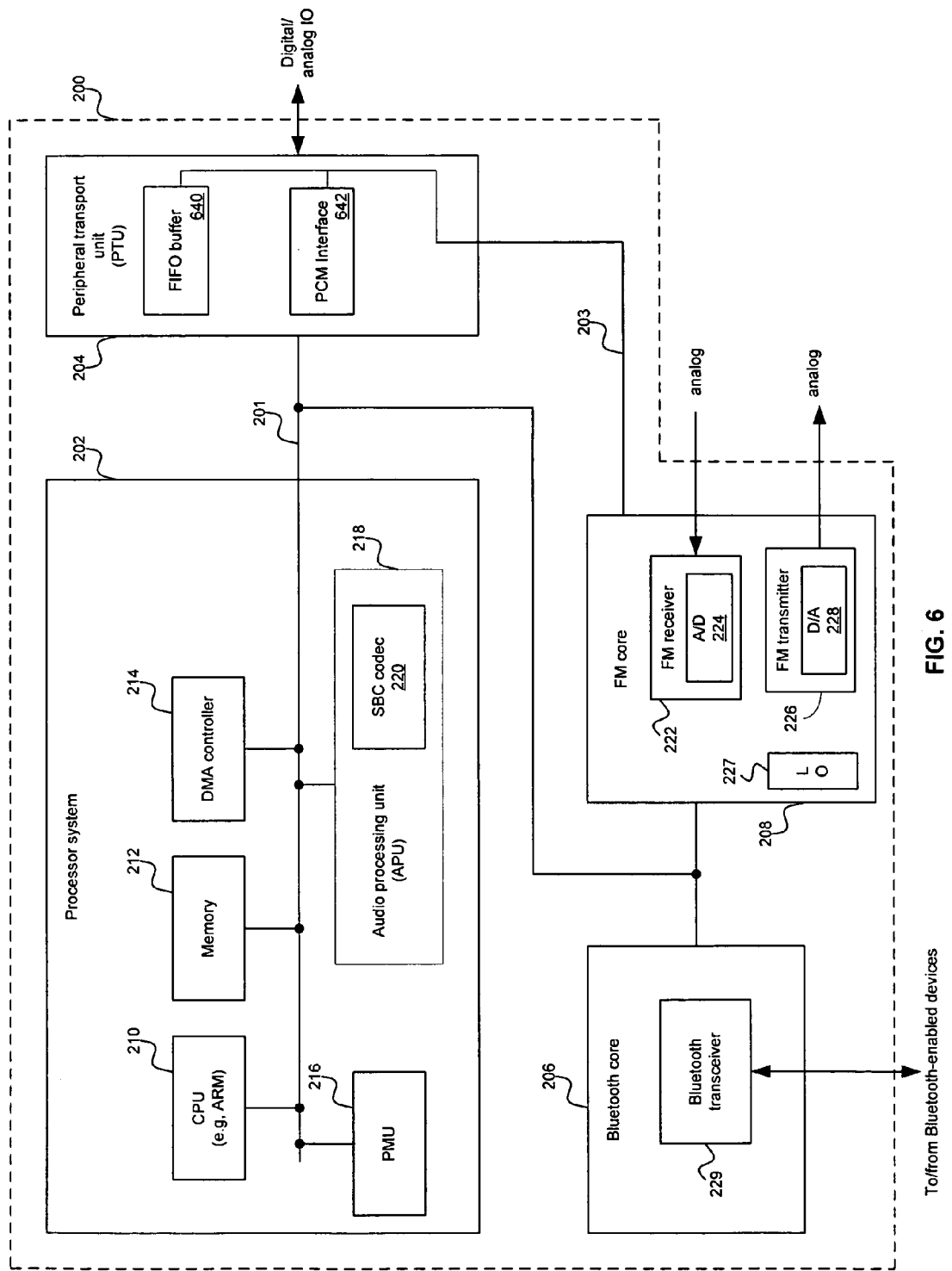
FIG. 6 is a block diagram of an exemplary single chip that supports routing of FM data to a Bluetooth enabled device via a Bluetooth link, in accordance with an embodiment of the invention.

FIG. 6 is a block diagram of an exemplary single chip that supports routing of FM data to a Bluetooth enabled device via a Bluetooth link, in accordance with an embodiment of the invention. Referring to FIG. 6, there is shown a single chip 200 that may comprise a processor system 202, a peripheral transport unit (PTU) 204, a Bluetooth core 206, a frequency modulation (FM) core 208, and a common bus 201. A FM transmitter 226 may be an external device to the single chip 200 and may be communicatively coupled to the single chip 200 via the FM core 208, for example. The FM transmitter 226 may be a separate integrated circuit (IC), for example.

The processor system 202 may comprise a central processing unit (CPU) 210, a memory 212, a direct memory access (DMA) controller 214, a power management unit (PMU) 216, and an audio processing unit (APU) 218. The APU 218 may comprise a subband coding (SBC) codec 220. At least a portion of the components of the processor system 202 may be communicatively coupled via the common bus 201. The peripheral transport unit (PTU) 204 may comprise a first-in first-out (FIFO) buffer 640 and a pulse code modulated (PCM) interface 642. FIG. 6 may be substantially as described in FIG. 2A and FIG. 2B.

The PCM interface 642 may include logic, circuitry and/or code that enables passing voice samples using four pins, for example, a clock pin, a frame synchronization pin, an input data pin and an output data pin. The voice data may be sampled at 8 kHz at 12 to 16 bits per sample, for example. Each sample may be clocked in/out on the PCM interface 642 one bit at a time once every 125 microseconds, for example.

When an external FM transmitter attempts to transmit to a user with a Bluetooth enabled device, the FM audio data may be transmitted from the FM transmitter to the FM receiver 222. The FM receiver 222 within the single chip 200 may be enabled to receive the FM audio data from the external FM transmitter. The FM receiver 222 integrated within the single chip 200 enables communication of the received FM audio data via a dedicated link 203 that couples the FM receiver 222 to the FIFO buffer 640 and the PCM interface 642 that handles the encoding. The received audio data may be buffered by the FIFO buffer 640, de-jittered, and the voice data may be de-compressed. The voice may be converted to uniform samples, which may be passed via the PCM interface 642 at 8 kHz, for example, to the APU 218. The APU 218 may be enabled to translate the audio samples from mu-law, A-law or CVSD into a Bluetooth compatible format. The audio data may be communicated to the Bluetooth core 206 via the common bus 201. The audio data may be packetized and transmitted as SCO, eSCO or A2DP packets to the Bluetooth enabled device.

When a user speaks into a Bluetooth enabled device, for example, a Bluetooth headset 194 to a remote party, the voice may be sampled by the Bluetooth headset 194, converted into mu-law, A-law or continuous variable slope delta (CVSD) format. After conversion, the voice samples may be packetized into SCO, eSCO, HV3 or A2DP packets, and transmitted to the Bluetooth transceiver 229. The Bluetooth transceiver 229 may be enabled to receive the packetized SCO, eSCO, HV3 or A2DP packets, which may be processed by the Bluetooth core 206. The Bluetooth core 206 may communicate the packetized SCO, eSCO, HV3 or A2DP packets to the APU 218 for processing via the common bus 201. The APU 218 may be enabled to convert the voice back into uniform samples and transmit the samples to the PCM interface 642. The PCM interface 642 may be enabled to collect the samples into memory and encode the samples once every frame period, for example. The length of the frame period may depend on the type of voice compression, for example, 5 to 30 ms. After the voice compression, the samples may be decoded and transferred to the FM core 208 via the dedicated link 203. The FM transmitter 226 within the FM core 208 may transfer the decoded data for communication to an FM receiver in another device.

Figure 7:
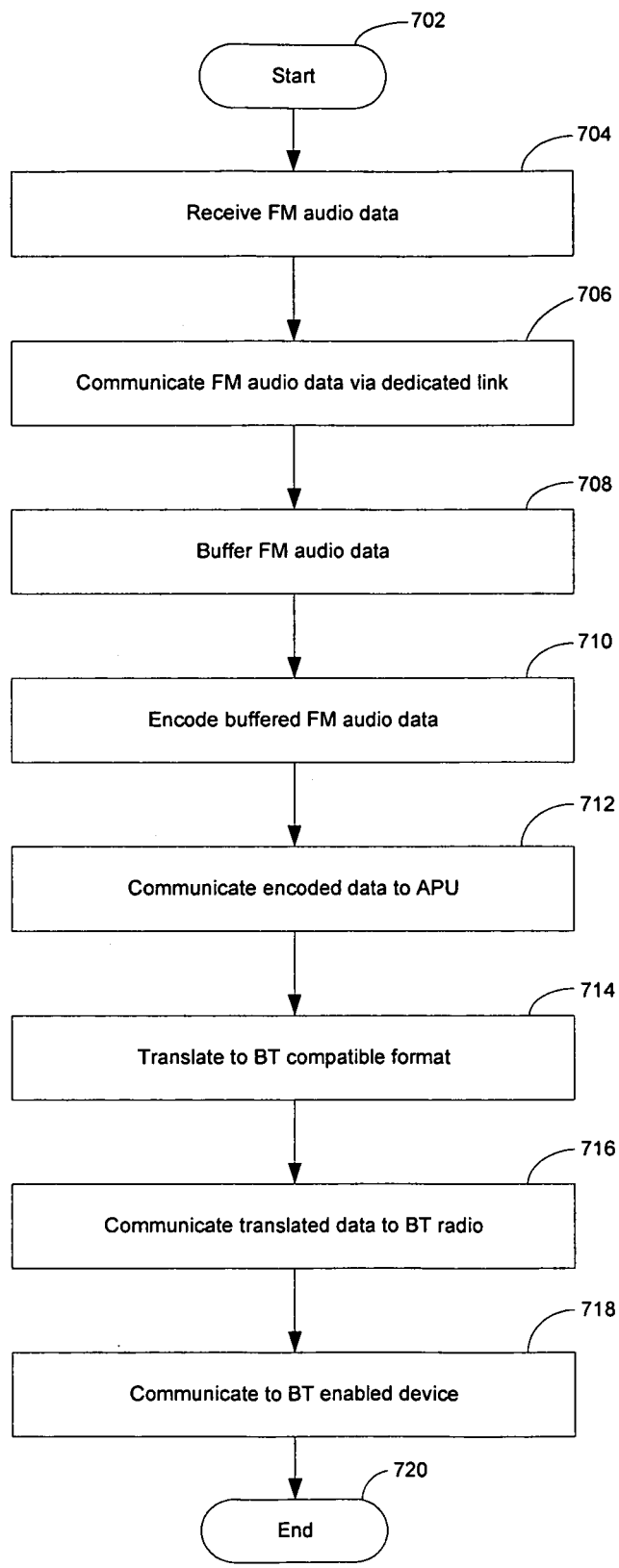
FIG. 7 is a flowchart illustrating exemplary steps to route FM data to a Bluetooth enabled device via a Bluetooth link, in accordance with an embodiment of the invention.

FIG. 7 is a flowchart illustrating exemplary steps to route FM data to a Bluetooth enabled device via a Bluetooth link, in accordance with an embodiment of the invention. Referring to FIG. 7, exemplary steps may begin at step 702. In step 704, the FM receiver 222 within the single chip 200 may be enabled to receive the FM audio data from the external FM transmitter. In step 706, the FM receiver 222 enables communication of the received FM audio data via a dedicated link 203 that couples the FM receiver 222 to the FIFO buffer 640 and the PCM interface 642 that handles the encoding. In step 708, the received audio data may be buffered by the FIFO buffer 640, de-jittered, and the voice data may be de-compressed.

In step 710, the FM audio data may be encoded to uniform samples, by the PCM interface 642 at 8 kHz, for example. In step 712, the encoded data may be communicated to the APU 218. In step 714, the APU 218 may be enabled to translate the audio samples from mu-law, A-law or CVSD into a Bluetooth compatible format. In step 716, the translated audio data may be communicated to the Bluetooth core 206 via the common bus 201. In step 718, the audio data may be packetized and transmitted as SCO, eSCO or A2DP packets to the Bluetooth enabled device. Control may then pass to end step 720.

Figure 8:
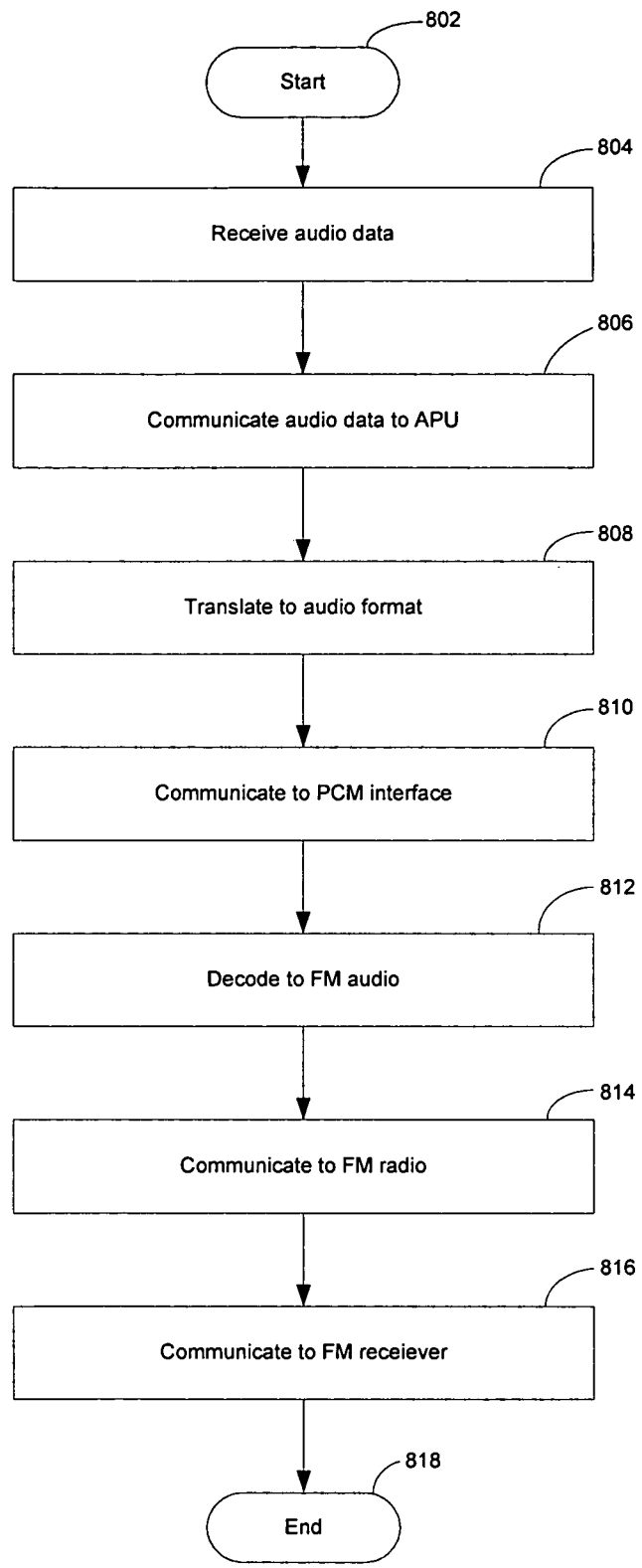
FIG. 8 is a flowchart illustrating exemplary steps to route Bluetooth data to a FM radio via a Bluetooth link, in accordance with an embodiment of the invention.

FIG. 8 is a flowchart illustrating exemplary steps to route Bluetooth data to a FM radio via a Bluetooth link, in accordance with an embodiment of the invention. Referring to FIG. 8, exemplary steps may begin at step 802. In step 804, the Bluetooth transceiver 229 within the single chip 200 may be enabled to receive the audio data from the external Bluetooth enabled device. The received audio data may be converted into mu-law, A-law or continuous variable slope delta (CVSD) format. The audio samples may be packetized into SCO, eSCO, HV3 or A2DP packets, and transmitted to the Bluetooth transceiver 229. The Bluetooth transceiver 229 may be enabled to receive the packetized SCO, eSCO, HV3 or A2DP packets, which may be processed by the Bluetooth core 206.

In step 806, the Bluetooth core 206 may communicate the packetized SCO, eSCO, HV3 or A2DP packets to the APU 218 for processing via the common bus 201. In step 808, the APU 218 may be enabled to convert the audio samples back into uniform samples. In step 810, the uniform samples may be transmitted to the PCM interface 642. In step 812, the PCM interface 642 may be enabled to collect the samples into memory and encode the samples once every frame period, for example. The length of the frame period may depend on the type of voice compression, for example, 5 to 30 ms. In step 814, the samples may be decoded and transferred to the FM core 208 via the dedicated link 203. In step 816, the FM transmitter 226 within the FM core 208 may transfer the decoded data for communication to an FM receiver in another device. Control may then pass to end step 818.

In an embodiment of the invention, the FM data may be transported over the HCI link in a RAW data format at a streaming bit rate of 1.536 Mb/s for 48 MHz sampling. However, since the audio bandwidth of FM is 15 KHz, with about 70 dB SNR as maximum expected, 32 KHz sampling with 12 bits/sample, for example, may be used to give a streaming bit rate requirement of 768 Kb/s, for example. The stereo FM data may be down-sampled to 8 KHz, and the audio filters may be reprogrammed to 4 kHz corner frequencies, for example. A mono stream may be sent via Bluetooth SCO or eSCO link to a Bluetooth headset of other device. Two Bluetooth voice connections may also be used to transport stereo. The FM stereo data may be SBC encoded and transported as an A2DP link towards a remote Bluetooth device, where 32 kHz joint stereo may be the default SBC format, but other sampling rates such as 44.1 or 48 kHz, for example, may be supported.

In one embodiment of the invention, the single chip with integrated FM and Bluetooth radios may implement a search algorithm that collects and stores data during scanning of the FM band. The single chip may determine whether there is music or speech in a detected channel. Moreover, the single chip may enable searching and finding 10 of the strongest stations, for example, and may rank them.

In another embodiment of the invention, the single chip with integrated FM and Bluetooth radios may implement a search algorithm where the searches may be done based on a specific criteria such as type of station or type of music, for example. The single chip may characterize each of the stations found based on the search.

In another embodiment of the invention, the single chip with integrated FM and Bluetooth radios may enable turning OFF a voltage regulator to the FM radio when in BT-only mode or turning OFF voltage regulators to the Bluetooth radio and the FM radio when both Bluetooth and FM are not being used, for example. In another embodiment of the invention, the single chip with integrated FM and Bluetooth radios may enable extending the battery life in a handheld device by requiring that the single chip does not consume power until configured by the host. Moreover, there may not be a load on the system until the chip is powered down and/or the chip may not draw any current when powered down.

In another embodiment of the invention, the single chip with integrated FM and Bluetooth radios may enable a digital filter that may combine de-emphasis, bass, and/or treble. A digital filter that may combine de-emphasis, base, and/or treble. The digital filter may have a programmable audio bandwidth, for example. In another embodiment of the invention, the single chip with integrated FM and Bluetooth radios may enable a power amplifier dynamical bypass for Class 1 systems. In another embodiment of the invention, the single chip with integrated FM and Bluetooth radios may enable an antenna with an adjustable center frequency.

In another embodiment of the invention, the single chip with integrated FM and Bluetooth radios may enable Bluetooth coexistence with WLAN. In this regard, coexistence may be supported when radiation of energy is not greater than a certain threshold. In some cases, such threshold may be 90 dBm, for example. The coexistence may be implemented to minimize the amount of energy that flows from the Bluetooth radio to the WLAN radio, for example. In this regard, the single chip may utilize a guilty-by-association technique in order to identify WLAN interfering channels in the vicinity of a Bluetooth device. Because WLAN channels may deteriorate very rapidly in the presence of Bluetooth communication, the guilty-by-association technique may enable a fast determination or identification of which adaptive frequency hopping (AFH) channels to block in order to limit the effect of Bluetooth communication on WLAN channels. Channel measurement statistics may be collected in 'bins' of N MHz each where N=2, 3, 4, etc and condemn the entire bin as bad if any K of the channels in the bin was measured as bad. An example may be when K=1. Condemnation of the entire bin as bad, that is, guilty-by-association, may increase both the reliability as well as speed with a WLAN channels of contiguous 20~22 MHz that may be blocked out in the AFH channel map. The use of techniques that modify the AFH channel map need not be limited to instances when a Bluetooth radio and an FM radio are integrated into a single chip. Modification of the AFH channel map may be applied to instances when Bluetooth applications are in coexistent operation with WLAN applications.

The WLAN interfering channels may be detected by utilizing channel measurement statistics such as received signal strength indicator (RSSI) energy measurements and/or packet error rate (PER) measurements. PER measurements may include missing a packet due to synchronization errors, cyclic redundancy check (CRC) errors in decoding the header, and/or CRC errors in decoding the payload, for example. These measurements may be performed during the Bluetooth frame duration (1.25 ms) on the current Bluetooth channel or on channels different from the current Bluetooth channel.

In another embodiment of the invention, the single chip with integrated FM and Bluetooth radios may enable a low noise FM phase-locked loop (PLL) that may minimize the 32 KHz clock noise and/or the large phase noise that may occur. In this regard, the FM PLL may utilize a narrow loop bandwidth, for example.

In another embodiment of the invention, the single chip with integrated FM and Bluetooth radios may disable at least a portion of the analog circuitry in the FM radio and/or the Bluetooth radio when performing digital processing. Disabling analog circuitry provides a reduction in the amount of power consumed by the single chip.

In another embodiment of the invention, the single chip with integrated FM and Bluetooth radios may be enabled to support high definition (HD) radio systems. In HD radio systems, the broadcasters may utilize digital signals to transmit existing analog AM and FM signals. In this regard, the analog AM and FM signals may be transmitted simultaneously and the use of digital channels may result in higher quality audio and a more robust signal. In first generation HD radio systems, services such as Main Program Service or Station Reference Service may be provided. Other services that may be supported for HD radio in the single chip may be requests for audio presentation of news, weather, entertainment, and/or stocks, for example. Additional services may comprise navigational products or applications, such as traffic information, for example, time-shifted listening, mobile commerce and advertisement, Internet-based broadcasts, and/or reading services for the visually impaired.

In another embodiment of the invention, a system for providing wireless communication may comprise a single chip 200 that enables encoding FM audio data received by a FM radio 118. The single chip 200 enables translation of the encoded received FM audio data to a Bluetooth compatible format. The single chip 200 enables communication of the translated received FM audio data to at least one off-chip Bluetooth enabled device, for example, Bluetooth enabled headset 194 via a Bluetooth radio 116. A first-in first-out (FIFO) buffer 640 integrated within the single chip 200 may enable buffering of the received FM audio data. A pulse code modulated (PCM) interface 642 integrated within the single chip 200 may enable pulse code modulation of the buffered received FM audio data. The Bluetooth radio 116 integrated within the single chip 200 enables communication of the received FM audio data to at least one off-chip Bluetooth enabled device, for example, Bluetooth enabled headset 194 via at least one of the following: a synchronous connection oriented (SCO) link, an extended SCO (eSCO) link, and an advanced audio distribution profile (A2DP) link. The FM radio 118 integrated within the single chip 200 enables communication of the received FM audio data via a dedicated link 203 that couples the FM radio 118 to a PCM interface 642 that handles the encoding.

The Bluetooth radio 116 integrated within the single chip 200 enables receiving of audio data from at least one off-chip Bluetooth enabled device, for example, Bluetooth enabled headset 194 via at least one of the following: a synchronous connection oriented (SCO) link, an extended SCO (eSCO) link, and an advanced audio distribution profile (A2DP) link. The single chip 200 enables encoding of the received audio data into at least one of: A-law format, mu-law format, and continuous variable slope delta (CVSD) format. The single chip 200 enables translation of the encoded received audio data to FM audio data. The FM radio 118 integrated within the single chip 200 enables transferring of the translated FM data out of the single chip 200 via an analog interface.

In one embodiment of the invention, the single chip 200 may enable transporting of FM data over a Bluetooth link. In another embodiment of the invention, the single chip 200 may enable routing of FM data to a Bluetooth A2DP link.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:
   in a single chip that comprises a Bluetooth radio and a Frequency Modulation (FM) radio:
   receiving FM audio data by an FM receiver;
   communicating said received FM audio data to a buffer via a dedicated link to generate encoded received FM audio data;
   translating within said single chip, said encoded received FM audio data to a Bluetooth compatible format, said translating being performed by an Audio Processing Unit (APU), said APU being communicatively coupled to said buffer via a common bus;
   communicating said translated received FM audio data to a Bluetooth core via said common bus; and
   transmitting said translated received FM audio data to at least one off-chip Bluetooth enabled device via said Bluetooth core.

2. The method according to claim 1, wherein said buffer comprises a first-in first-out (FIFO) buffer integrated within said single chip.

3. The method according to claim 2, wherein said encoded received FM audio data is generated by buffering said received FM audio data and pulse code modulating said buffered received FM audio data.

4. The method according to claim 1, wherein transmitting said translated received FM audio data comprises transmitting said translated received FM audio data via one or more of: a synchronous connection oriented (SCO) link, an extended SCO (eSCO) link, and/or an advanced audio distribution profile (A2DP) link.

5. The method according to claim 1, wherein said dedicated link directly couples said FM receiver to said buffer.

6. The method according to claim 1, comprising receiving data from said at least one off-chip Bluetooth enabled device via one or more of: a synchronous connection oriented (SCO) link, an extended SCO (eSCO) link, and/or an advanced audio distribution profile (A2DP) link.

7. The method according to claim 6, comprising encoding said received data into one or more of: A-law format, mu-law format, and continuous variable slope delta (CVSD) format.

8. The method according to claim 7, comprising translating said encoded received data to FM data.

9. The method according to claim 8, comprising transferring said translated FM data out of said single chip via an analog interface communicatively coupled to said FM radio.

10. A machine-readable storage having stored thereon, a computer program having at least one code section for providing wireless communication, the at least one code section being executable by a machine for causing the machine to:
    in a single chip that comprises a Bluetooth radio and a Frequency Modulation (FM) radio:
    receive FM audio data by an FM receiver;
    encode by a Peripheral Transport Unit (PTU) within said single chip, said received FM audio data, said PTU being communicatively coupled to said FM receiver via a dedicated link;
    translate by an Audio Processing Unit (APU) within said single chip, said encoded received FM audio data to a Bluetooth compatible format, said APU being communicatively coupled to said PTU via a common bus; and
    communicating said translated received FM audio data to a Bluetooth core via said common bus.

11. The machine-readable storage according to claim 10, wherein said at least one code section is executable by said machine for causing said machine to buffer said received FM audio data in a first-in first-out (FIFO) buffer integrated within said single chip, said PTU comprising said FIFO buffer.

12. The machine-readable storage according to claim 11, wherein said at least one code section is executable by said machine for causing said machine to pulse code modulate said buffered received FM audio data by said PTU.

13. The machine-readable storage according to claim 10, wherein said FM radio comprises said FM receiver and a local oscillator (LO).

14. The machine-readable storage according to claim 10, wherein said dedicated link directly couples said FM receiver to said PTU, said PTU comprising a Pulse Code Modulation (PCM) interface that handles said encoding.

15. The machine-readable storage according to claim 10, wherein said at least one code section is executable by said machine for causing said machine to receive data from at least one off-chip Bluetooth enabled device via one or more: a synchronous connection oriented (SCO) link, an extended SCO (eSCO) link, and/or an advanced audio distribution profile (A2DP) link.

16. The machine-readable storage according to claim 15, wherein said at least one code section is executable by said machine for causing said machine to encode said received data into one or more of: A-law format, mu-law format, and/or continuous variable slope delta (CVSD) format.

17. The machine-readable storage according to claim 16, wherein said at least one code section is executable by said machine for causing said machine to translate said encoded received data to FM data.

18. The machine-readable storage according to claim 17, wherein said at least one code section is executable by said machine for causing said machine to transfer said translated FM data out of said single chip via an analog interface communicatively coupled to said FM radio.

19. A system for providing wireless communication, the system comprising:
- a Frequency Modulation (FM) core in a single chip being operable to receive FM audio data;
- a Peripheral Transport Unit (PTU) in said single chip being operable to encode said received FM audio data, said PTU being communicatively coupled to an FM receiver via a dedicated link;
- an Audio Processing Unit (APU) in said single chip being operable to translate said encoded received FM audio data to a Bluetooth compatible format, said APU being communicatively coupled to said PTU via a common bus; and
- a Bluetooth core in said single chip being operable to receive said translated received FM audio data via said common bus.

20. The system according to claim 19, wherein said FM core comprises said FM receiver and a local oscillator (LO).

21. The system according to claim 20, wherein said PTU is operable to generate said encoded received FM audio data by buffering said received FM audio data and pulse code modulating said buffered received FM audio data.

22. The system according to claim 19, wherein said Bluetooth core is operable to communicate said translated received FM audio data to at least one off-chip Bluetooth enabled device via one or more of: a synchronous connection oriented (SCO) link, an extended SCO (eSCO) link, and/or an advanced audio distribution profile (A2DP) link.

23. The system according to claim 19, wherein said PTU comprises a Pulse Code Modulation (PCM) interface that handles said encoding.

24. The system according to claim 19, wherein said Bluetooth core is operable to receive data from at least one off-chip Bluetooth enabled device via one or more of: a synchronous connection oriented (SCO) link, an extended SCO (eSCO) link, and/or an advanced audio distribution profile (A2DP) link.

25. The system according to claim 24, wherein said Bluetooth core is operable to encode said received data into one or more of: A-law format, mu-law format, and/or continuous variable slope delta (CVSD) format.

26. The system according to claim 25, wherein said PTU is operable to translate said encoded received data to FM data.

27. The system according to claim 26, wherein said FM core is operable to transfer said translated FM data out of said single chip via an analog interface.

* * * * *